United States Patent
Reichelt

(10) Patent No.: US 6,345,180 B1
(45) Date of Patent: Feb. 5, 2002

(54) MOBILE TERMINAL RESERVE POWER SYSTEM

(75) Inventor: Martin Reichelt, Plano, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/222,968

(22) Filed: Dec. 30, 1998

(51) Int. Cl.$^7$ ............................................. H04N 1/00
(52) U.S. Cl. ...................... 455/404; 455/343; 455/574
(58) Field of Search .................... 455/404, 414, 455/67.1, 67.7, 343, 550, 574

(56) References Cited

U.S. PATENT DOCUMENTS

| | | | |
|---|---|---|---|
| 5,027,428 A | * | 6/1991 | Ishiguro et al. ............... 455/67 |
| 5,265,270 A | * | 11/1993 | Stengel et al. ............... 455/343 |
| 5,438,696 A | * | 8/1995 | Napoles ....................... 455/343 |
| 5,563,931 A | * | 10/1996 | Bishop et al. ................. 379/59 |
| 5,684,790 A | * | 11/1997 | Hirasawa .................... 370/252 |
| 5,884,148 A | * | 3/1999 | Bilgic et al. ................. 455/74.1 |
| 5,959,543 A | * | 9/1999 | LaPorta et al. ............. 455/31.3 |
| 5,960,337 A | * | 9/1999 | Brewster et al. ............ 455/404 |
| 5,974,300 A | * | 10/1999 | LaPorta et al. ............. 455/31.2 |
| RE36,712 E | * | 5/2000 | Sato et al. ................... 455/550 |
| 6,067,171 A | * | 5/2000 | Yamada et al. ............. 455/404 |
| 6,115,596 A | * | 9/2000 | Raith et al. ................. 455/404 |

OTHER PUBLICATIONS

ETSI, GSM Technical Specification: Digital Cellular Telecommunications System; Unstructured Supplementary Service Data (USSD) Stage 2, GSM 03.90, Dec. 1996, Version 5.0.0.

* cited by examiner

*Primary Examiner*—Daniel Hunter
*Assistant Examiner*—Thuan T. Nguyen

(57) ABSTRACT

A mobile terminal with a reserve power system is provided herein, wherein if the mobile terminal has detected that the power level of the power supply connected to it has fallen below a predetermined emergency power reserve level it will restrict its activities related to the reception of transmissions, such as voice calls, and activities related to contacting the network during stand-by, in order to protect the capability to place and receive calls to/from a default or user-specified set of numbers (e.g., emergency numbers, number of spouse, number of parents etc.). The restriction on the reception of transmissions can be handled by the network, by the mobile terminal or both.

18 Claims, 18 Drawing Sheets

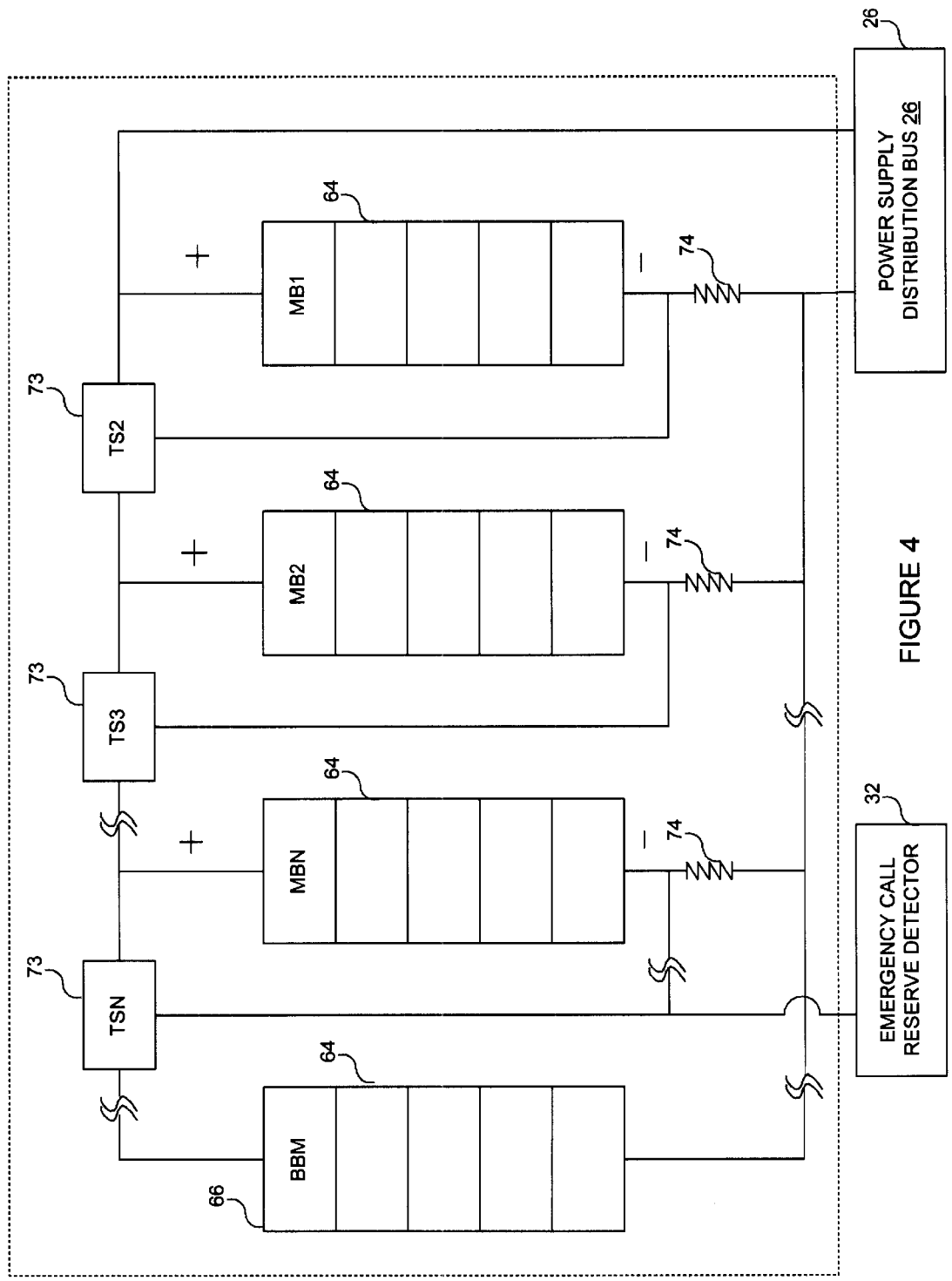

MOBILE TERMINAL RESERVE POWER SYSTEM

BACKGROUND OF THE INVENTION

This invention relates generally to battery powered mobile terminals, such as but not limited to portable mobile telephones and portable computers, which have limited battery power supplies that become depleted during operation of said mobile terminals.

Portable battery powered devices such as personal mobile terminals that are manually carried by a person, as opposed to static locally powered devices, are operated on a rechargeable battery power supply that becomes depleted during mobile use when not connected to an external source of power such as an AC/DC converter. It is known in battery powered terminals such as mobile telephones to provide a battery monitor circuit to monitor the level of remaining battery power available for telephone call making operations of the mobile telephone. A general display of the battery power remaining is made available upon actuation of an appropriate function key. When the battery power supply level has fallen beneath an absolute minimum limit, or depletion level needed to make or continue an ongoing call, then a special indication or warning is given of this low power disabled condition. Once this disabled condition is reached, it is impossible to use the mobile terminal whatsoever, including emergency use.

It is widely recognized that mobile terminals can be vital for emergency use. Mobile terminals such as mobile telephones enable the user to make emergency calls for police, paramedic and fire fighting services and to make calls to private emergency numbers to parents, spouses and other family relations and to other numbers which one needs to call in the case of emergency.

In order for mobile terminals to remain "connected" to thereby realize their ability to communicate throughout a network, a link to the network must be established and maintained. In this network constant position updates are required so when another network participant is attempting to reach the particular mobile terminal, it can be determined where to reach the terminal. Thus, power must be consumed during the position updates as well as when the actual data is being transferred within the network.

In the course of the creation of the invention, it has been considered that because people will often not monitor the level of the battery power supply and will also not carry a charged replacement battery, known mobile terminals have a serious shortcoming. It is possible for a mobile terminal to find themselves in an emergency, including a life or death emergency, in which their mobile terminal is disabled because of operation of the terminal for non-emergency use that depleted the battery power supply beneath the minimum absolute limit required to make any use, including emergency use. It is possible for a child or teenager provided with use of a mobile terminal solely for purposes of enabling them to call or receive calls from home or to place calls to other special emergency numbers, to deplete the battery during operation of the mobile terminal during non-emergency calls despite instructions to the contrary.

What is desired, therefore, is a way to allocate a predetermined reserve power level in a mobile for emergency or pre-selected activity use. Filed concurrently with this application is a related application by the same inventor entitled, "A RESERVE POWER SYSTEM FOR ANY BATTERY OPERATED DEVICE". The present invention is distinguished from the concurrently filed application in that the prevention of reception, as opposed to prevention of initiating, of calls by the network and mobile terminal is accomplished herein. This is can be done, as described below, by means associated within the network in conjunction with the terminal as well as by means of only within the terminal itself. In the aforementioned concurrently filed application, the mobile terminal was prevented from actuating the send key function when an emergency power situation was present and no functionality occurred at the network level.

Accordingly, it is an object of the present invention to utilize the improved system, method and apparatus for monitoring power levels in a battery operated device, described in the concurrently filed application, to prevent the reception of calls, either by means located in the mobile terminal; by means located at the network level; or both, when the power level of the mobile device is at a predetermined emergency power level.

It is also an object of the present invention to restrict the mobile terminal and network activities related to contacting the network during stand-by in order to protect the capability to place and receive calls to/from a default or user-specified set of numbers.

SUMMARY OF THE INVENTION

A mobile terminal with a reserve power system is provided herein, wherein if the mobile terminal has detected that the power level of the power supply connected to it has fallen below a predetermined emergency power reserve level, it will restrict its activities related to the reception of calls and activities related to contacting the network during stand-by in order to protect the capability to place and receive transmissions, such as voice calls, to/from a emergency or user-specified set of numbers (e.g., emergency numbers, number of spouse, number of parents etc.) The restriction on the reception of transmissions can be handled by the network, by the mobile terminal or both.

In accordance with the invention, one embodiment of the present invention is a mobile terminal having a battery power supply with a total power level that declines during operation, a means for detecting when the power level decreases beneath an emergency call reserve level that is greater than the absolute minimum level, a means for alerting the network to which the mobile terminal belongs that the mobile terminal is in a low power state, a means for the network to determine which transmissions are to be allowed to be sent to the mobile terminal when the mobile terminal is in an emergency power state, and a means for preventing the sending of the non-emergency transmissions to the mobile terminal when the mobile terminal is in an emergency power state.

In accordance with the invention, another embodiment of the present invention is a mobile terminal having a battery power supply with a total power level that declines during operation, a means for detecting when the power level decreases beneath an emergency call reserve level that is greater than the absolute minimum level, a means by which the mobile terminal restricts reception on incoming non-emergency transmissions.

In addition, a multi-standard mobile terminal can further reduce its power consumption by preventing operation in (a) high power consumption mode(s) such as in an "analogue" mode, after the power level has fallen beneath the emergency power reserve level. In the situation where the user is not expecting any important calls, the mobile can also power down after it has given a warning to the user. If the power level increases above the reserve power level (e.g., the mobile terminal has been connected to an external power supply) the restrictions are removed.

In accordance with the invention, yet another embodiment of the present invention is a mobile terminal having a battery power supply with a total power level that declines during operation, a means for detecting when the power level decreases beneath an emergency call reserve level that is greater than the absolute minimum level, and a means by which the mobile terminal can negotiate with the network a reduction of operations for which it is required to establish radio contact between the network and the mobile terminal.

In accordance with the invention, yet another embodiment of the present invention is a mobile terminal having a battery power supply with a total power level that declines during operation, a means for detecting when the power level decreases beneath an emergency call reserve level that is greater than the absolute minimum level, and a means to determine if the necessary signaling strength exceeds an acceptable predetermined maximum which is applicable after the mobile terminal has entered a protected mode; and a means for preventing continued communication with the network.

BRIEF DESCRIPTION OF THE DRAWINGS

The disclosed inventions will be described with reference to the accompanying drawings, which show important sample embodiments of the invention and which are incorporated in the specifications hereof by reference, wherein:

FIGS. 2B–2F are logic flow charts of the preferred embodiment of the emergency call capability protector program of the invention that is stored in the emergency call capability protector program memory of the mobile terminal of FIG. 1A;

FIG. 2G is a sequence diagram which describes the messages sent between the mobile terminal and the network to inform the network about the extent to which the terminal requests to restrict activities involving communication between the terminal and the network. Further, to inform the mobile terminal about the extent to which the network supports said requested restrictions of said activities;

FIGS. 2H–2K are logic flow charts describing the steps performed in the network (MSC/VLR 314) to accommodate the mobile terminal's request to restrict activities involving communication between the terminal and the network;

FIG. 4 is a functional block diagram of another suitable embodiment of the emergency call reserve power detector and the battery power supply circuit in which the battery power supply circuit includes a series of main and backup batteries that are successively switched into the power providing circuit as power is drawn from the supply and decrease beneath the reserve power level is detected by detecting when a selected one of the backup batteries is switched into circuit;

DETAILED DESCRIPTION

Figure 1A:
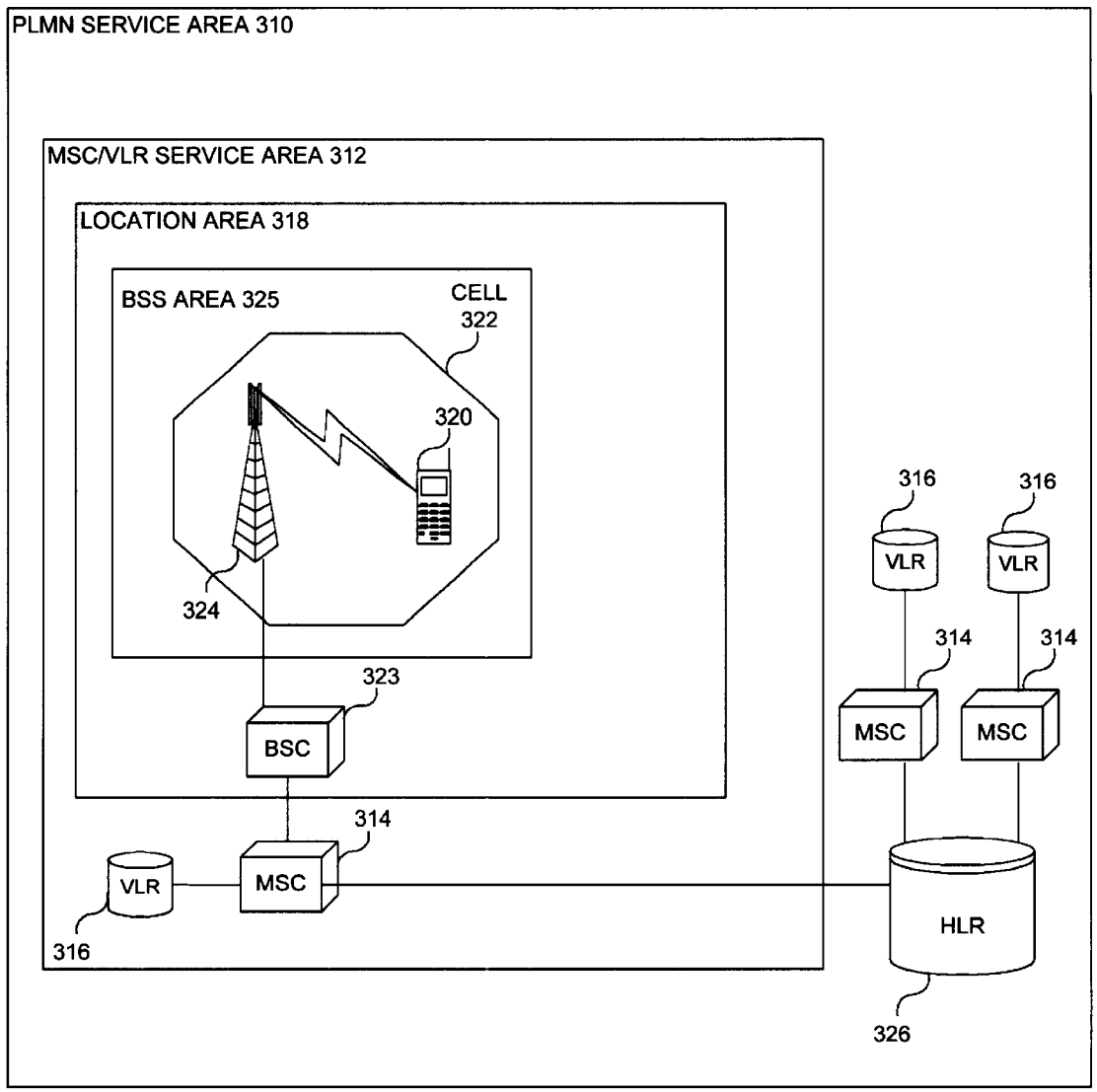
FIG. 1A is an illustration of a cellular network, such as a GSM Public Land Mobile Network (PLMN)

With reference now to FIG. 1A of the drawings, there is illustrated a GSM Public Land Mobile Network (PLMN), such as cellular network 310, which in turn is composed of a plurality of areas 312, each with a Mobile Switching Center (MSC) 314 and an integrated Visitor Location Register (VLR) 316 therein. The MSC/VLR areas 312, in turn, include a plurality of Location Areas (LA) 318, which are defined as that part of a given MSC/VLR area 312 in which a mobile station (MS) (terminal) 320 may move freely without having to send update location information to the MSC/VLR 314 that controls the LA 318. Each Location Area 18 is divided into a number of cells 322. Mobile Station (MS)320 is the physical equipment, e.g., a portable phone, used by mobile subscribers to communicate with the cellular network 310, each other, and users outside the subscribed network, both wireline and wireless.

The MSC 314 is in communication with at least one Base Station Controller (BSC) 323, which, in turn, is in contact with at least one Base Transceiver Station (BTS) 324. The BTS 324 is the physical equipment, illustrated for simplicity as a radio tower, that provides radio coverage to the cell 322 for which it is responsible. It should be understood that the BSC 323 may be connected to several BTS's 324, and may be implemented as a stand-alone node or integrated with the MSC 314. In either event, the BSC 323 and BTS 324 components, as a whole, are generally referred to as a Base Station System (BSS) 325.

With further reference to FIG. 1A, the PLMN Service Area or cellular network 310 includes a Home Location Register (HLR) 326, which is a database maintaining all subscriber information, e.g., user profiles, current location information, International Mobile Subscriber Identity (IMSI) numbers, and other administrative information, for subscribers registered within that PLMN 310. The HLR 326 may be co-located with a given MSC 314, integrated with the MSC 314, or alternatively can service multiple MSCs 314, the latter of which is illustrated in FIG. 1A.

The VLR 316 is a database containing information about all of the MS's 320 currently located within the MSC/VLR area 312. If an MS 320 roams into a new MSC/VLR area 312, the VLR 316 connected to that MSC 314 requests data about that MS 320 from the HLR database 326 (simultaneously informing the HLR 326 about the current location of the MS 320). Accordingly, if the user of the MS 320 then wants to make a call, the local VLR 316 will have the requisite identification information without having to reinterrogate the HLR 326. In the aforedescribed manner, the VLR and HLR databases 316 and 326, respectively, contain various subscriber information associated with a given MS 320.

To restrict the activities related to the reception of calls, the MS 320, will request the network (e.g. Mobile Services Switching Center in GSM) completely or partially stop initiating operations (e.g., sending calls or sending of text messages) towards MS 320. Optionally, the user can provide the network with a set of numbers for which received calls will still lead to the setting up of a call. As the MS 320 moves within the network the information related to the low power situation of the MS 320 will either be repeatedly sent to the network or transferred within the network.

If the network does not support the requested functionality, the determination if a call offered by the network should be accepted can be performed at the MS 320. The determination can either be done by the user or automatically by the MS 320. In the first case, the MS 320 gives a warning to the user informing them about the fact that the power level has fallen below the emergency power reserve level. Optionally the user is prompted for confirmation. In the second case, the MS 320 compares the received calling party number with a set of stored emergency numbers. If the received calling party number matches one of the stored emergency numbers, the MS 320 offers the call to the user. Optionally, the aforementioned warning can be given. In the event the user is not expecting important calls, the mobile terminal can also power down after it has given a notification to the user and not received an indication from the user not to power down.

When a MS 320 is in stand-by mode it remains in contact with the network. If the power level of the MS 320's power supply falls below the emergency power reserve level, the MS 320 can negotiate with the network about a reduction of operations for which it is required to establish radio contact between the network and the MS 320.

Due to the diversity of standards, there exists MS 320s which support one or more standards. For example, Dual mode phones supporting a digital system such as GSM and analog system such as AMPS. While the power level of the power supply is below the emergency power reserve level, the MS 320 can inhibit the operation in the mode(s) which consume the most power. In the above example, operation in analogue mode would be inhibited because it consumes significantly more power than operation in a digital mode. Optionally, the MS 320 can notify the user if it cannot access any network due to this restriction.

In terrestrial networks, the distance between the MS 320s and the current access point to the network (e.g., BTS 324) determines the needed signaling strength for the radio transmissions. The greater the distance between the MS 320 and the access point to the network, the greater the required signaling strength, and therefore the greater is the power usage of the power supply of the MS 320. If the power level of the power supply falls below the emergency power reserve level, the following applies. If the necessary signaling strength exceeds the acceptable maximum which is applicable after the MS 320 has entered protected mode for more than a specified time, the MS 320 will warn the user and power off. Optionally, the user can prevent the MS 320 from powering off by activating an override function.

Figure 1B:
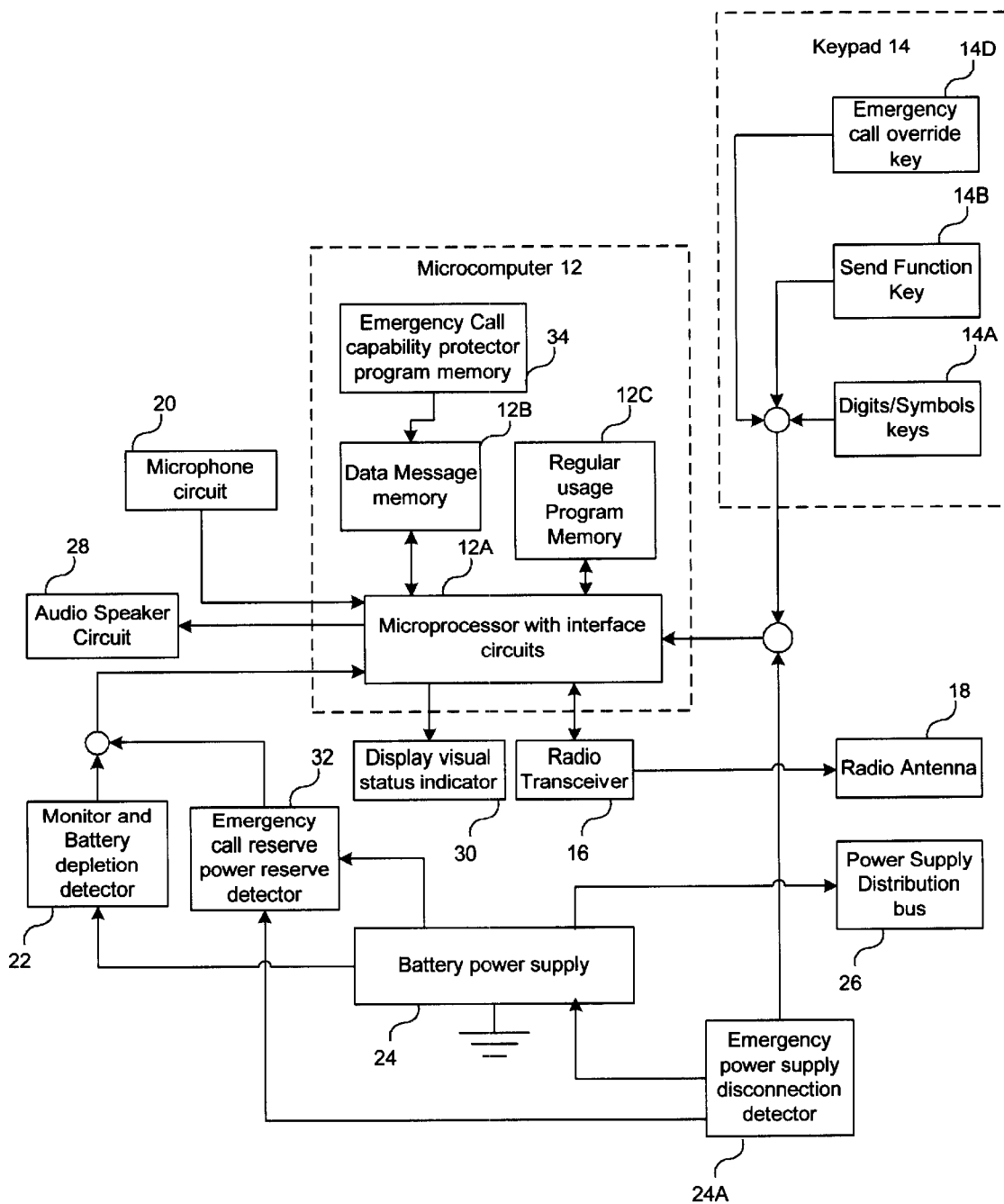
FIG. 1B is a functional block diagram of the preferred embodiment of the emergency call capability protecting mobile telephone of the present invention.

Referring now to FIG. 1B, a battery powered device is exemplified in the preferred embodiment of the emergency call capability protecting mobile telephone of the invention and is seen to include some conventional elements found in known mobile phones. These conventional elements include a microcomputer 12 that controls the other elements of the mobile telephone 10 to perform all of its operations in response to inputs from a keypad 14, a radio transceiver 16 which transmits and receives signals through air via an antenna 18, a microphone circuit 20 and a monitor and battery depletion detector 22.

The monitor and battery depletion detector 22 has at least one input connected to a battery power supply circuit 24. The battery power supply circuit 24 includes a rechargeable, releasably attached battery pack (not shown) including at least one battery cell. Preferably, the monitor and battery depletion detector, or depletion detector 22 monitors the power level of the battery power supply circuit 24. It provides a signal to the microcomputer 12 when the power remaining decreases beneath a pre-selected absolute minimum limit necessary to make, receive or maintain any type of mobile calls. In such event, the microcomputer 12 provides a low power supply indication signal to the display-visual status indicators 30, which responds by disabling the radio transmitter 16 and other nonessential components from drawing further power from the battery power supply. This is done to prevent excessive depletion and possible damage to the battery. In this power shutdown condition, no mobile calls can be made, received or continued.

The battery power supply circuit 24 produces DC power at a pre-selected DC voltage level that is distributed to all the other components via a power supply distribution bus 26. The power distribution bus 26 includes bus conductors printed on one or more circuit boards to which other components are mounted and other appropriate connectors as needed to deliver DC power to the various components. Connected directly to the battery supply circuit 24 is an external power supply disconnection detector 24A for determining when external power supply is removed thereby necessitating battery power. microcomputer 12 also provides output control signals to an audio speaker circuit 28, to an alphanumeric display and visual status indicators 30 and to the radio transmitter 16. It receives voice and other audio input signals from a microphone circuit 20. Further, it receives signals from an external power supply disconnection detector 24A.

The keypad 14 includes digits and symbols keys 14A and a send function key 14B. In addition, a special emergency call override key 14D is preferably provided for use only with the mobile telephone version of this invention. All of these keys are connected to inputs of the microcomputer 12.

Once a connection between the mobile terminal and the network has been established, as will be discussed below, the MS 320 can inform the network if it is in an emergency power setting. Actuation of the emergency call override key 14D is used to override and confirm override disablement of non-emergency call capability as explained in more detail below. The microcomputer 12 includes a conventional microprocessor with suitable interface circuits, or microprocessor 12A interfaced with all the other noncomputer components. It is also connected with a data and message memory 12B for storing preset data, emergency and other speed dial numbers, message buffers, and a regular usage program memory 12C. These conventional components perform functions as suggested by their names and are constructed in a manner that is well known by persons of ordinary skill in the art of mobile telephone design. The microcomputer 12A controls substantially all communication and administrative mobile telephonic functions of the mobile telephone 10 by methods well known the present art.

In accordance with the invention, in addition to the conventional components noted above, the call capability protecting mobile telephone 10 includes novel elements that cooperate with the conventional elements and with each other to obtain the advantages of the invention. In addition to the emergency call override key 14D mentioned above, these novel elements include an emergency call reserve power detector 32 that detects when the remaining power level, or power level, of the battery power supply circuit 24 decreases beneath an emergency all reserve level. Connected to said emergency call reserve power detector is a external power disconnection detector 24A which indicates when external power has been removed, thereby requiring battery power. In accordance with the invention, the emergency call reserve power level is greater than the absolute minimum limit, or depletion level. When the battery power level is decreased beneath the depletion level, the mobile telephone is disabled from making, receiving or continuing any mobile telephone calls both emergency and non-emergency calls. Depletion of the battery power supply circuit 24 is detected by the monitor and battery depletion detector 22. In accordance with the invention, the function performed by the reserve power detector is achieved by different means and in different ways depending upon the different types of batteries and circuits used to perform the battery power supply circuit function 24. These different embodiments are described below with reference to FIGS. 3, 4, 5A, 5B and 5C.

In general, the battery power supply circuit 24 provides input signals to the emergency call reserve power detector 32, and the emergency reserve power detector 32, in turn, provides signals to the microprocessor 12A from which the microprocessor determines whether the power has decreased beneath the emergency call reserve power level.

The emergency call capability protector of the present invention also includes an emergency call capability protector program memory 34 that contains an emergency call capability protector subroutine for controlling the microprocessor 12A. In keeping with an important aspect of the invention, the at least one precondition is the precondition of the power level decreasing beneath the emergency call reserve level as determined from the output signals from the reserve power detector. This protector subroutine interacts with the regular usage program memory, and preferably, both the regular usage program of memory 12C and the emergency call capability protector are stored in different sections of a single ROM. The emergency call capability protector program preferably operates in accordance with the logic flow chart of FIGS. 2B–2F.

FIG. 2B–2F describe the necessary actions of the GSM mobile terminal (i.e., mobile station (MS)) to achieve a reduction of incoming calls and a reduction of operations performed during stand-by, such as Periodic Location Updating. (Note: The network can order the MS to perform periodic LU every 6*n minutes so that the network can keep track of which MSs are reachable and which ones are not. If a MS fails to report to the network on time, the network treats the MS as if it is detached—until the MS establishes radio contact with the network again.) The flow charts show the different states in which the MS can be in and which are relevant for this invention. They further show the events which can occur in the different states and which are related to this invention. The flow charts also show the actions which the MS executes if an event has occurred and the new state which is subsequently entered.

The MS can be in the following three main states: 1) Normal mode 400; 2) Protected Mode—Terminal Only 440; and 3) Protected Mode Network 460. If the MS is in the "Normal Mode" 400 state, no restrictions apply. If the MS is in the "Protected Mode—Terminal Only" 440 state, the reduction of activities in the MS is only coordinated within the MS itself If the MS is in the "Protected Mode Network" 460 state, the reduction of activities in the MS is coordinated between the MS and the network.

Figure 2A:
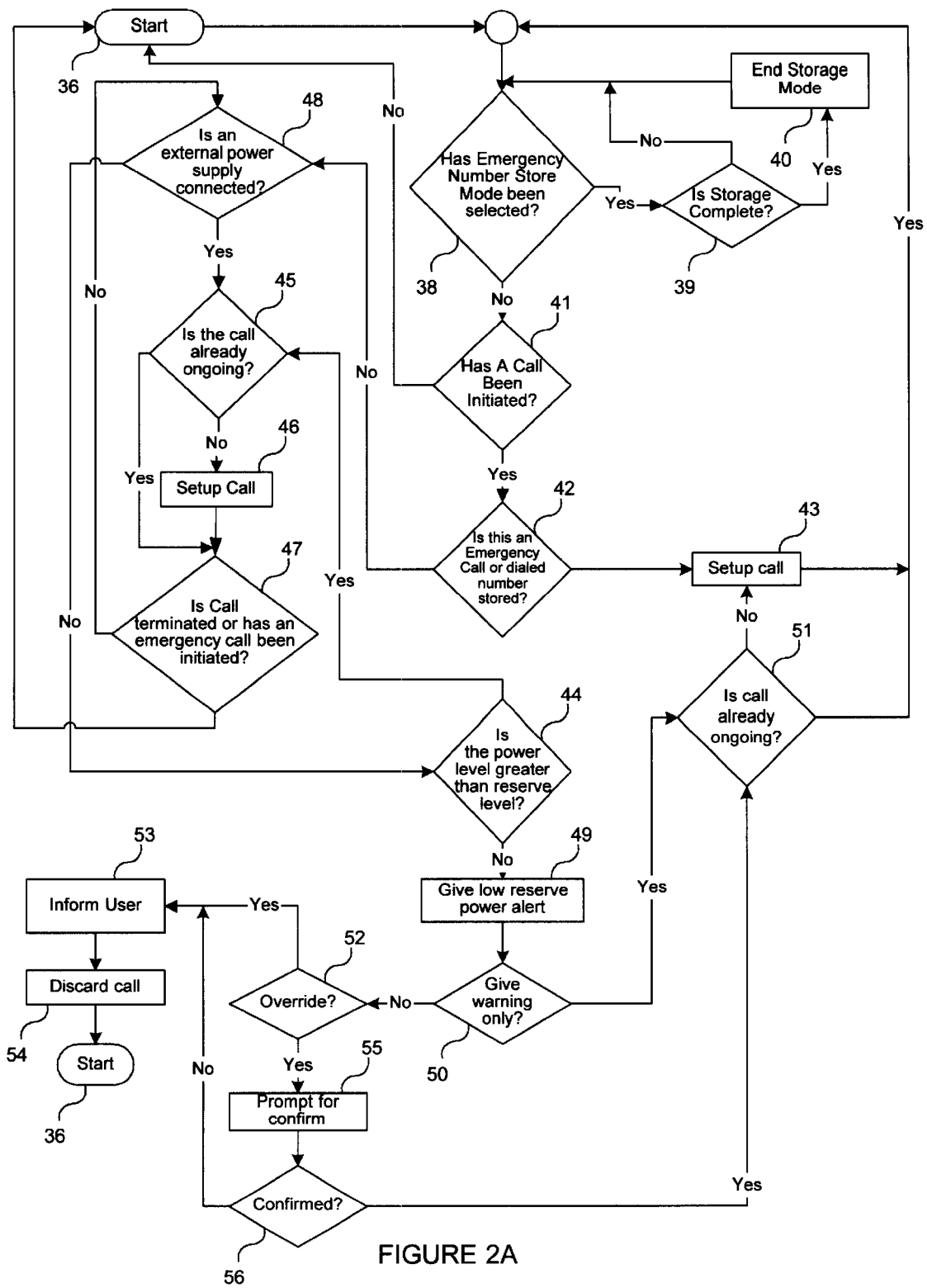
FIGS. 2A–2K combined exemplify a possible GSM embodiment for the interaction between the mobile terminal and the network and to call inhibiting techniques taking place in both the mobile terminal and the network itself.
Figure 2B:
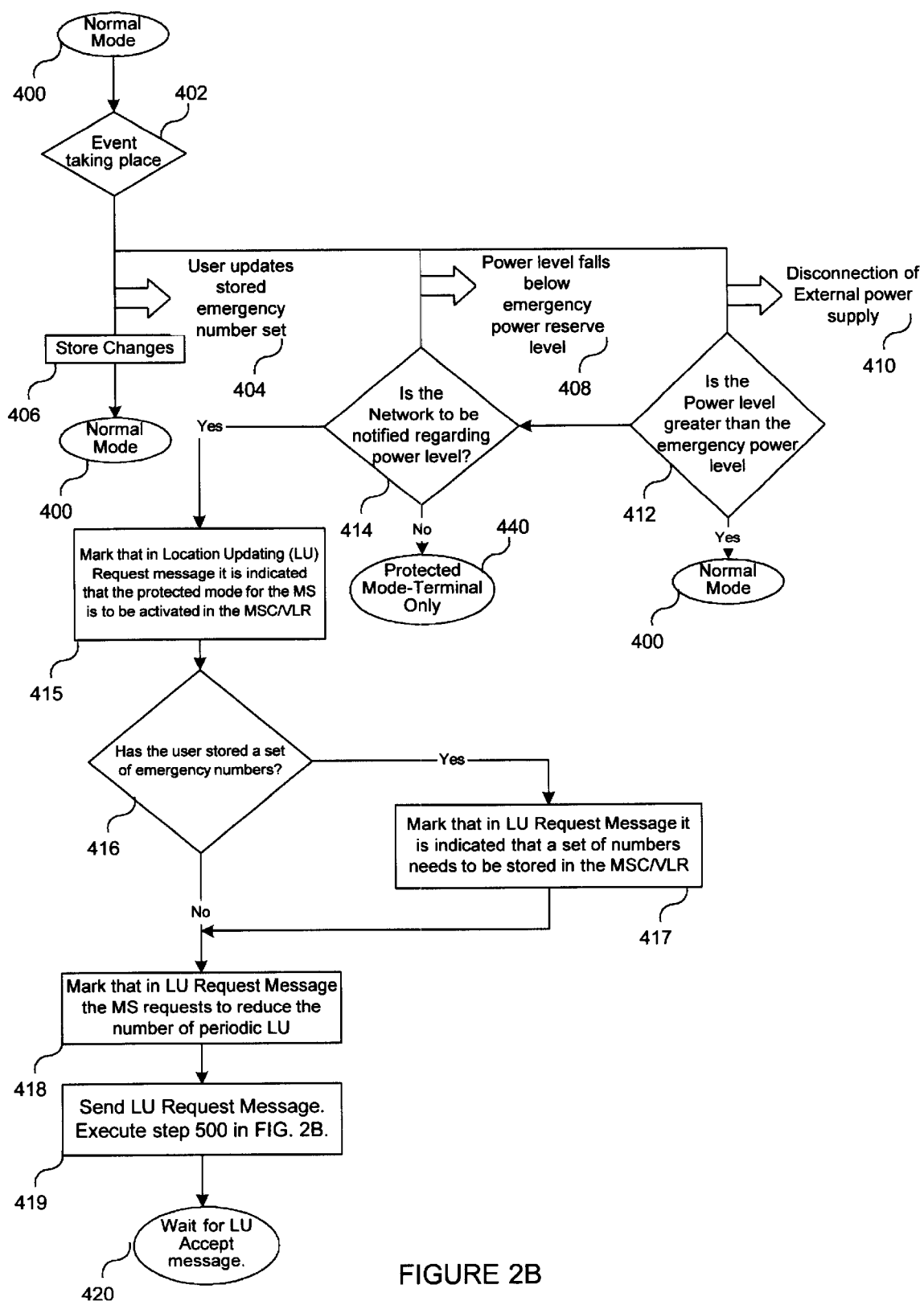

Referring now to FIG. 2B, in the case that the MS is in state "Normal Mode" 400 and the user updates the stored emergency number set, event 404, the MS stores the new numbers in step 406 and remains in state "Normal Mode" 400. In the case that the MS is in the "Normal Mode" 400 state and the power level of the power supply falls below the emergency power reserve level, event 408, the flow proceeds in step 414. In the case that the MS is in the "Normal Mode" 400 state and the disconnection of the external power supply is detected, event 410, the MS checks in step 412 if the power level is greater than the emergency power reserve level. If YES, the MS will remain in the "Normal Mode" 400 state. If NO, the flow proceeds to step 414 wherein the MS checks if the network is to be notified regarding the low power level. If NO, the MS enters the "Protected Mode—Terminal Only" 440 state. If in step 414 the YES branch is followed, it is marked in step 415 that in the Location Updating (LU) Request message the MS will inform the MSC/VLR about its low power situation and request the MSC/VLR to activate the 'protected mode' for the MS. In step 416, it is determined if the user has stored a set of emergency numbers in the MS. If YES, in step 417 it is marked that in the Location Updating (LU) Request message the MS will indicate to the MSC/VLR that a set of emergency numbers will need to be stored in the MSC/VLR. In both cases the flow will proceed to step 418 in which it is marked that in the Location Updating (LU) Request message the MS will request from the MSC/VLR that it may reduce the number of Periodic Lus. Subsequently, in step 419 the MS sends out the LU Request message towards the MSC/VLR. This is illustrated in step 500 in FIG. 2G. After the MS has sent out the LU Request message it enters the "Wait for LU Accept message" 420 state.

Figure 2C:
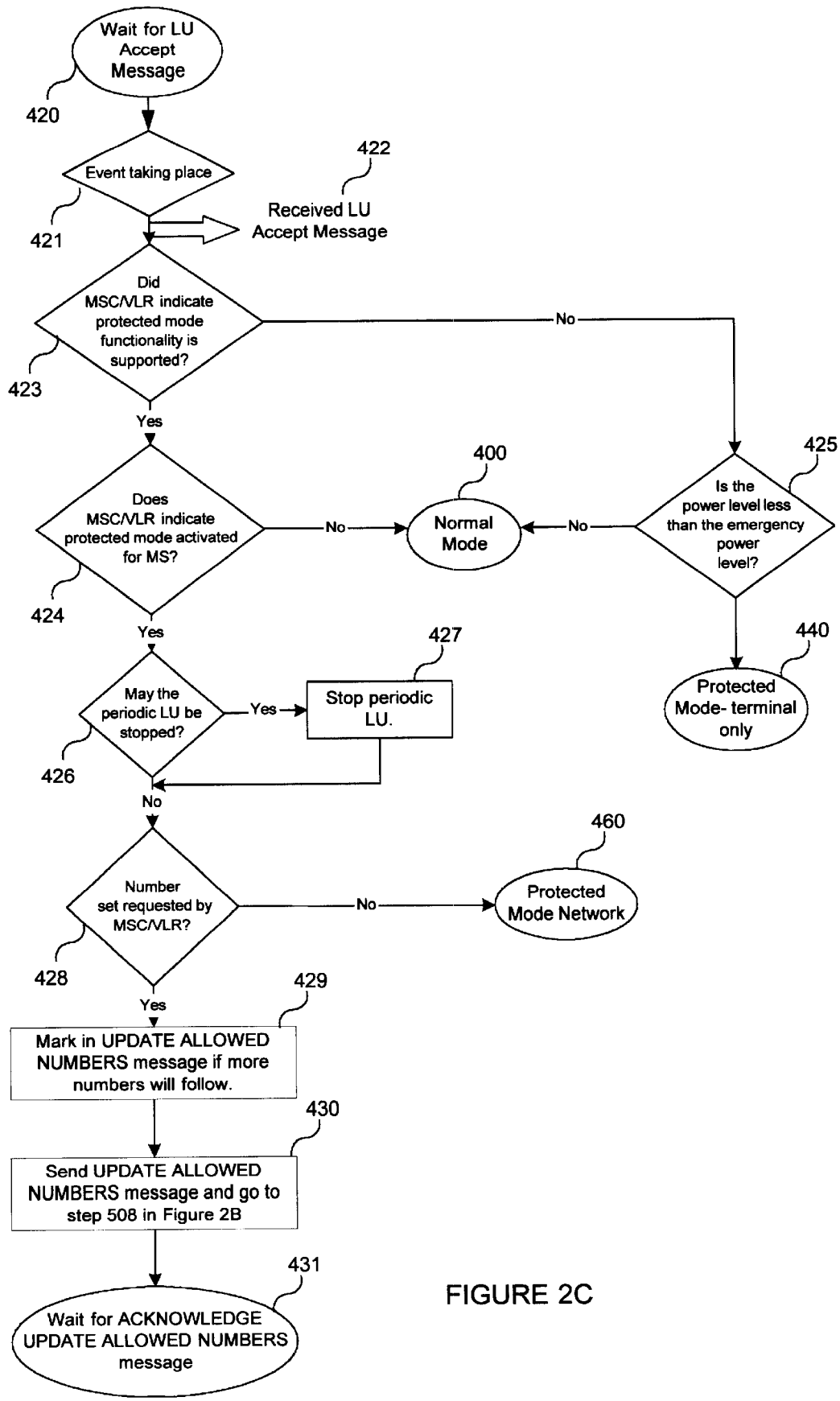

Referring now to FIG. 2C, if the MS is in the "Wait for LU Accept message" 420 state, and it receives this expected message, event 422, the MS will check in step 423 if the MSC/VLR has indicated support of the protected mode functionality. If NO, the MS checks in step 425 if the power level is less than the emergency power level. If NO, the MS enters the "Normal Mode" 400 state. If YES, the MS enters the "Protected Mode—Terminal Only" state 440. If YES in step 423, the MS further checks in step 424 if the MSC/VLR has indicated that it has activated the protected mode for the MS. If NO, the MS enters the "Normal Mode" 400 state. If YES, the MS checks in step 426 if it may stop sending periodic LU while it is in the low power state. If YES, it executes step 427 and stops periodic LU. It should be understood that whenever the MS enters the "Normal Mode" 400 state, periodic LU shall be resumed, if applicable. In step 428, the MS checks if the MSC/VLR has requested the MS to send the set of emergency numbers to the MSC/VLR. If NO, the MS enters the "Protected Mode Network" state 460. If YES, then in step 429, the MS marks for the UPDATE ALLOWED NUMBERS message whether or not the message UPDATE ALLOWED NUMBERS will have to be sent again with more numbers. In step 430, the MS sends out the UPDATE ALLOWED NUMBERS message towards the MSC/VLR. This is illustrated in step 508 in FIG. 2G. Subsequently, the MS enters the "Wait for ACKNOWLEDGE UPDATE ALLOWED NUMBERS message" 431 state.

Figure 2D:
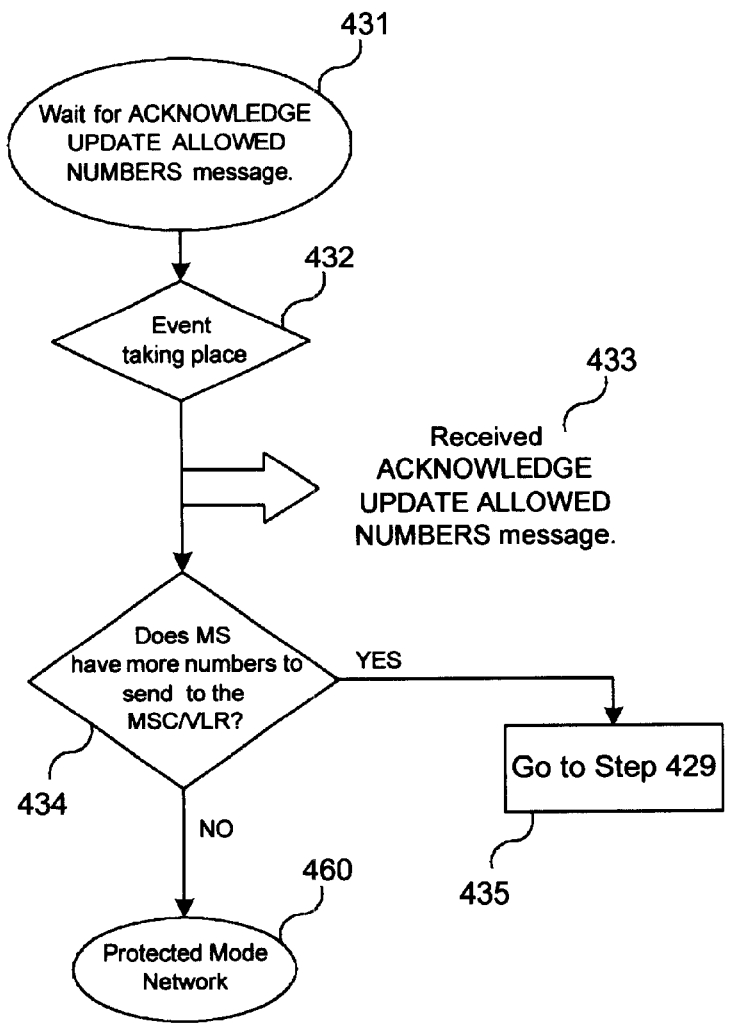

Referring now to FIG. 2D, if the MS is in the "Wait for ACKNOWLEDGE UPDATE ALLOWED NUMBERS message" 431 state, and it receives this expected message, event 433, the MS checks in step 434 if more numbers need to be sent to the MSC/VLR. If NO, the MS enters the state Protected Mode Network 460. If YES, in step 435 a jump is performed to step 429.

Figure 2E:
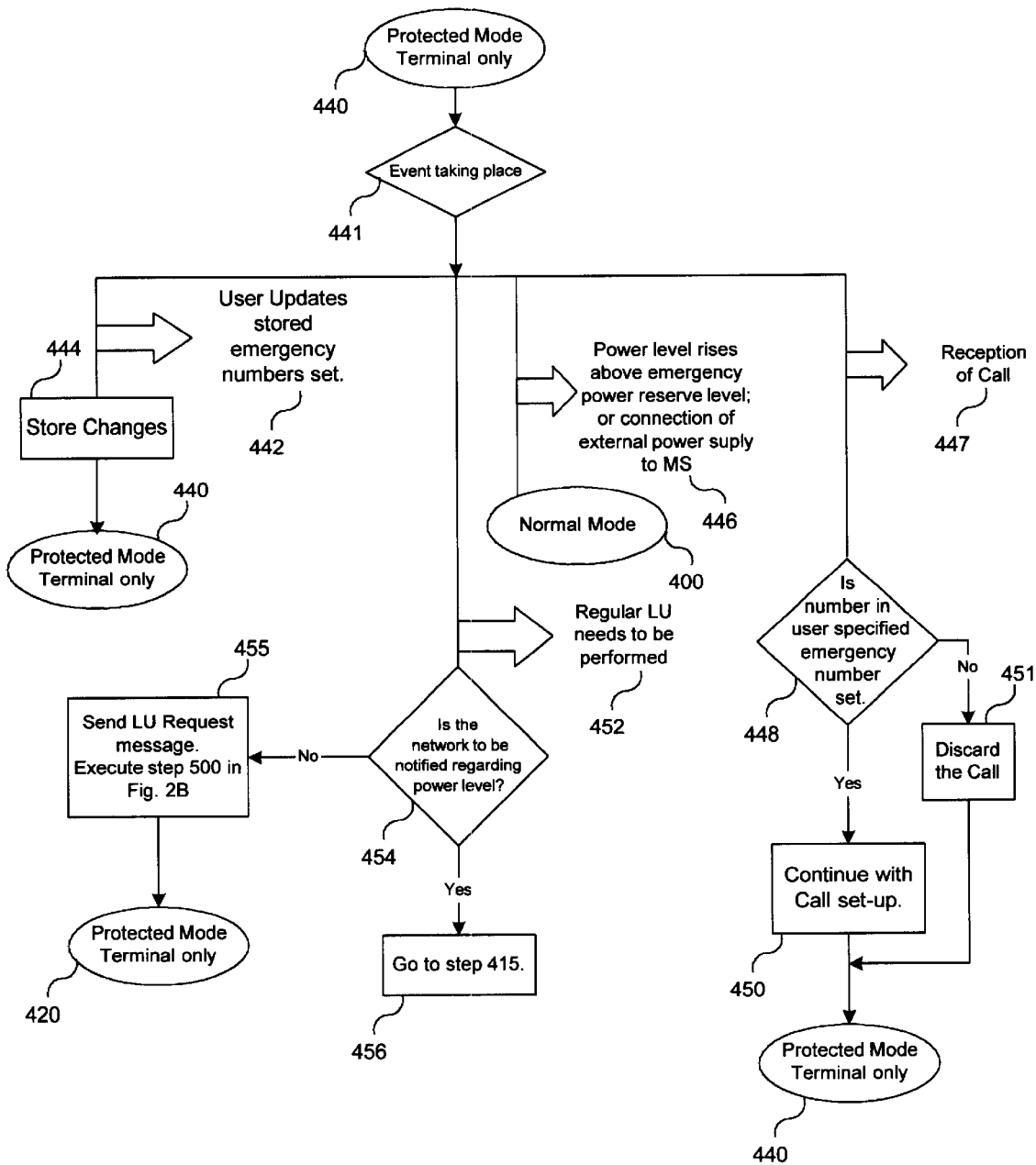

Referring now to FIG. 2E, in the case that the MS is in the "Protected Mode Terminal Only" 440 state and the user updates the stored emergency number set, event 442, the MS stores the new numbers in step 444 and remains in the "Protected Mode Terminal Only" 440 state. In the case that the MS is in the "Protected Mode Terminal Only" 440 state and a regular LU needs to be performed, event 452, the MS checks in step 454 if the network needs to be notified regarding the low power level. If YES, in step 456 a jump is performed to step 415. If NO, in step 455 the MS sends a LU Request message toward the MSC/VLR. This is illustrated in step 500 in FIG. 2G. After the MS has sent out the LU Request message it enters the "Wait for LU Accept message" 420 state. (Note: This case will result in the execution of step 603 in FIG. 2H. The new functionality in the MSC/VLR is not executed in this case.) In the case that the MS is in the "Protected Mode Terminal Only" 440 state and the power level of the power supply rises above the emergency power reserve level, or the MS is connected to an external power supply, event 446, the MS enters the "Normal Mode" 400 state. In the case that the MS is in the "Protected Mode Terminal Only" 440 state and a call is offered by the network, event 447, in step 448 the MS checks if the number of the incoming call is contained in the user specified emergency number set. If NO, the call is discarded in step 451 and the MS remains in the "Protected Mode—Terminal Only" 440 state. If YES, the call set-up is continued in step 450 and the MS remains in "Protected Mode Terminal Only" state 440.

Figure 2F:
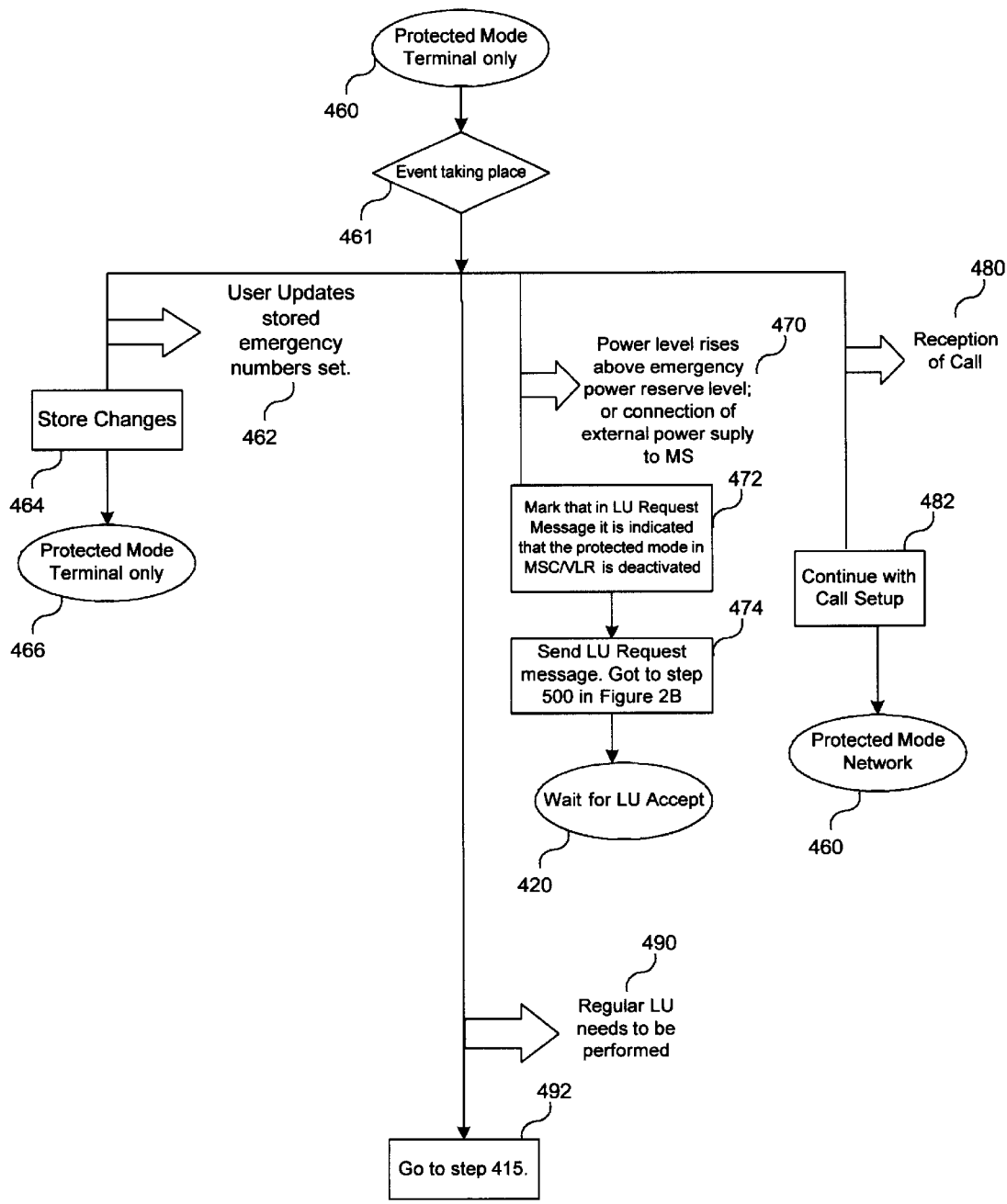

Referring now to FIG. 2F, in the case that the MS is in the "Protected Mode Network" 460 state and the user updates the stored emergency number set, event 462, the MS stores the new numbers in step 464 and in step 466 jumps to step 429 to store the new numbers in the MSC/VLR. In the case that the MS is in the "Protected Mode Network" 460 state and a regular LU needs to be performed, event 490, in step 492 a jump is performed to step 415. In the case that the MS is in the "Protected Mode Network" 460 state and the power level of the power supply rises above the emergency power reserve level, or the MS is connected to an external power supply, event 470, in step 472 the MS marks that in the LU Request message it will request the MSC/VLR to deactivate the protected mode. In step 474, the MS sends a LU Request message toward the MSC/VLR. This is illustrated in step 500 in FIG. 2G. After the MS has sent out the LU Request message, it enters the "Wait for LU Accept message" 420 state. In the case that the MS is in the "Protected Mode Network" 460 state and a call is offered by the network, event 480, in step 482 the MS continues with the call set-up and remains in the "Protected Mode Network" 460 state.

Figure 2G:
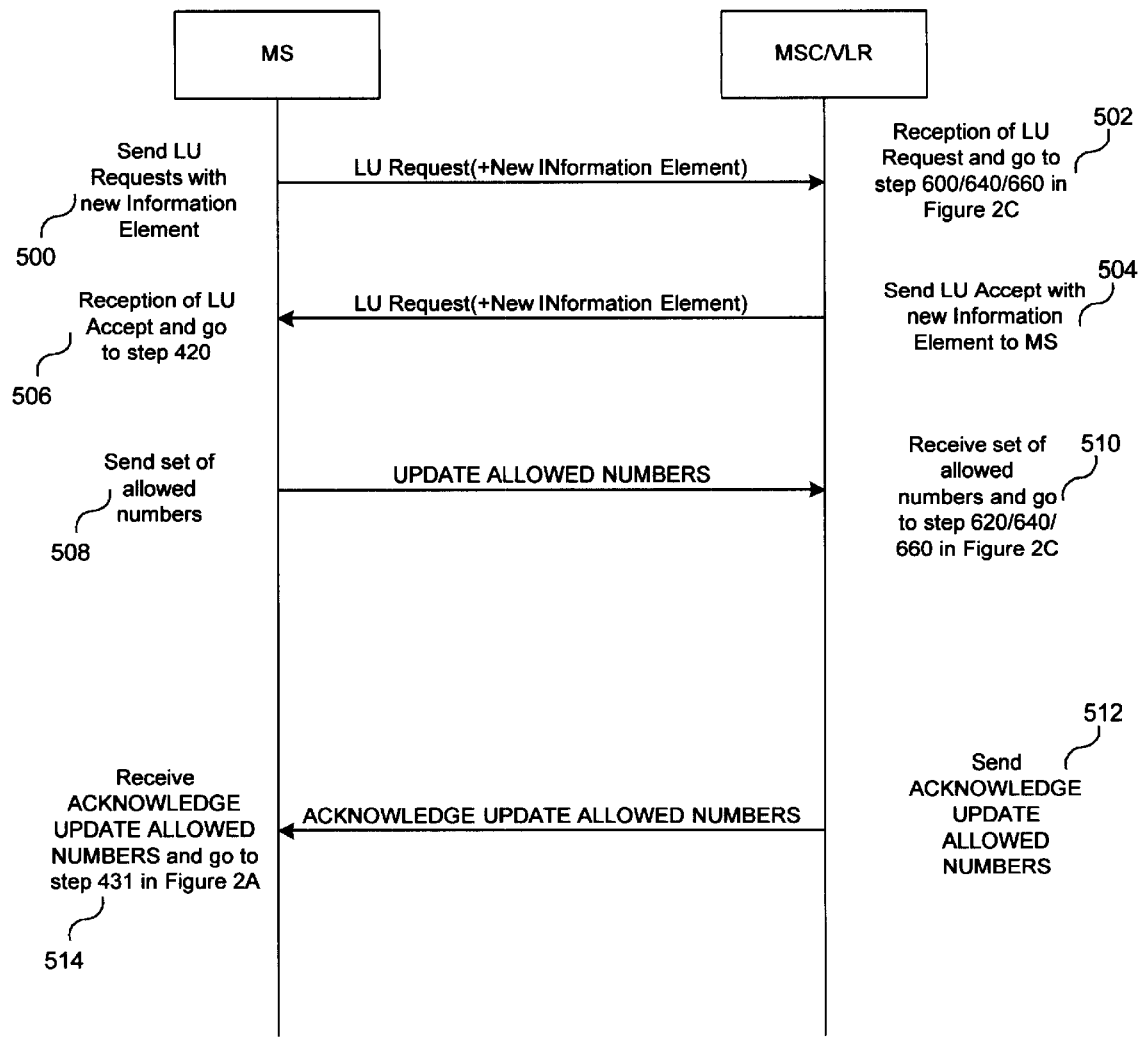

FIG. 2G shows the messages which are sent between the MS and the MSC/VLR to coordinate the reduction of activities in the MS. The LU Request message, sent by the MS in step 500, is extended by new Information Elements (IE) to send additional data related to the low power level in the MS to the MSC/VLR. The MS can request that the MSC/VLR not offer any calls, or only calls from a set of numbers, to the MS. The MS may also request that the MSC/VLR allow it to reduce the number of periodic LU. In step 502, the MSC/VLR receives the LU Request message from the MS. Depending on in which state the MSC/VLR is for the given MS, the corresponding step is jumped to, i.e. 600, 640, or 660 of FIG. 2H. The LU Accept message is sent out from the MSC/VLR in step 504, and received in the MS in step 506. The LU Accept message is also extended by new Ies. After the LU Accept message has been received by the MS, the flow proceeds to step 420.

The MS sends the numbers to which calls shall be allowed in step 508 towards the MSC/VLR in the new UPDATE ALLOWED NUMBERS message. Alternatively, the numbers could also be transferred to the MSC/VLR using USSD procedures. The MSC/VLR receives the message in step 510 and proceeds with step 620, 640, or 660 of FIG. 2H, depending on which state the MSC/VLR is in for the given user. The MSC/VLR sends the new ACKNOWLEDGE UPDATE ALLOWED NUMBERS message in step 512 to the MS which receives the message in step 514 and proceeds then with step 431 in FIG. 2D.

FIGS. 2H–2K, describe the necessary actions of the MSC/VLR to achieve a reduction of incoming calls and a reduction of operations performed during stand-by, such as Periodic Location Updating for the concerned MS. The flow charts show the different states in which the MSC/VLR can be in and which are relevant for this invention. They further show the events which can occur in the different states and which are related to this invention. The flow charts also show the actions which the MSC/VLR executes if an event has occurred and the new state which is subsequently entered. The MSC/VLR can be in the following three main states: "Normal mode" 600, "Protected Mode—No Calls" 640, and "Protected Mode—Screen Calls" 660. If the MS is in the "Normal Mode" 600 state, no restrictions for the concerned MS apply. If the MS is in the "Protected Mode—No Calls" 640 state, the MSC/VLR does not offer any incoming calls to the MS. If the MS is in the "Protected Mode—Screen Calls" 660 state, the MSC/VLR offers calls from a user specified set of numbers to the MS.

Figure 2H:
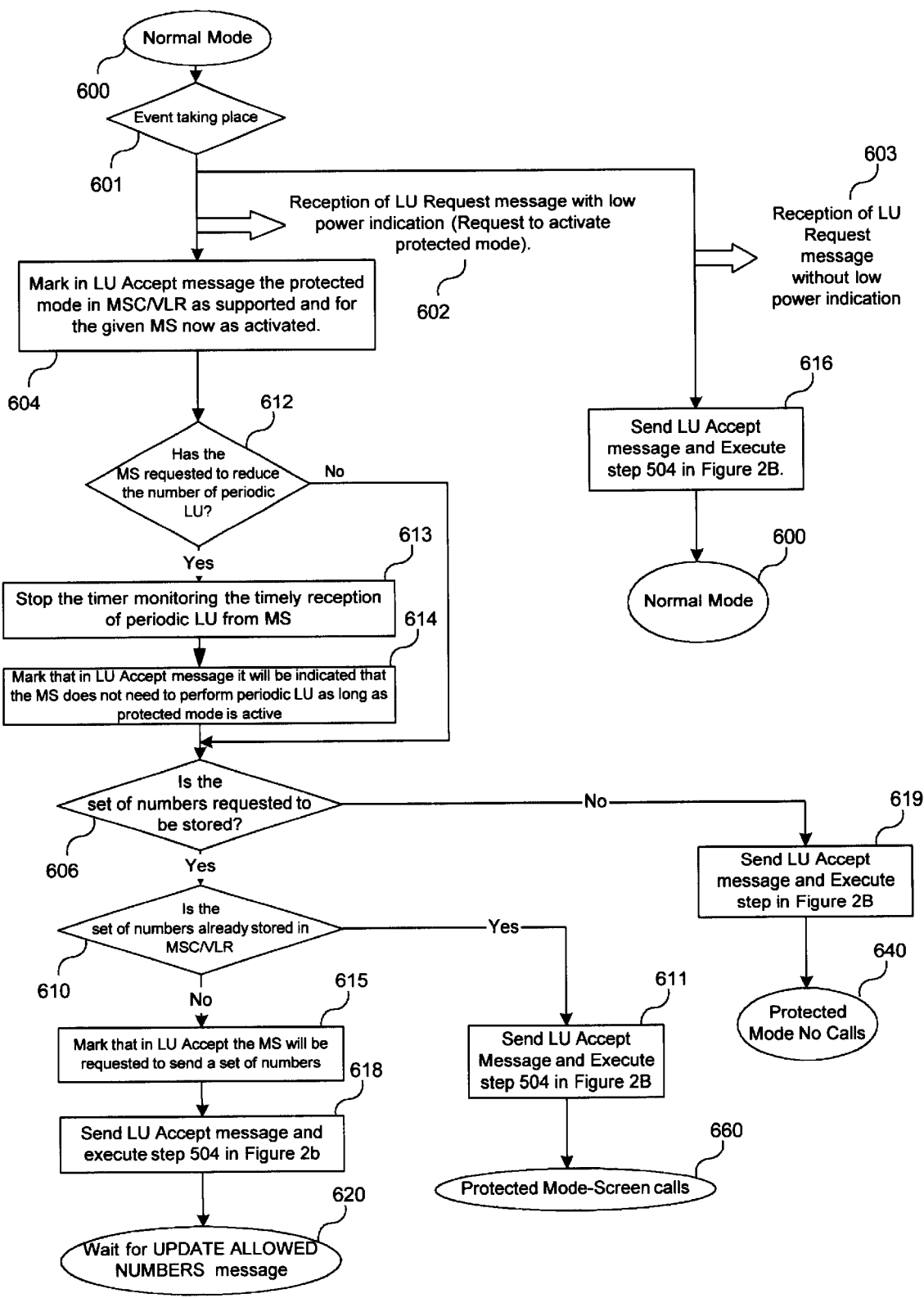

Referring now to FIG. 2H, in the case that the MSC/VLR is in the "Normal Mode" 600 state and the event taking place is the Reception of LU Request message without low power indication 603, the MSC/VLR will not perform any new functionality related to this invention and send back the LU Accept message to the MS in step 616. This is illustrated in step 504 in FIG. 2G. After the MSC/VLR has sent out the LU Accept message, it remains in the "Normal Mode" 600 state. In the case that the MSC/VLR is in the "Normal Mode" 600 state and the event taking place is the Reception of LU Request message with low power indication 602, in step 604 the MSC/VLR marks that in the LU Accept message the protected mode in the MSC/VLR will be indicated as supported and for the given MS as now activated. In step 612, it is checked if the MS has requested to reduce the number of periodic LU. If NO, the flow continues with step 606. If YES, then the MSC/VLR stops the monitoring of the timely reception of periodic LU from the MS in step 613. In step 614, the MSC/VLR marks that in the LU Accept message it will be indicated that the MS does not need to perform periodic LU as long as it is in protected mode. In step 606, it is checked if the MS has requested to store a set of numbers in the MSC/VLR. If NO, the LU Accept message is sent towards the MS in step 619. This is illustrated in step 504 in FIG. 2G. After the MSC/VLR has sent out the LU Accept message it enters the "Protected Mode—No Calls" 640 state. If YES, the MSC/VLR checks in step 610 if the set of numbers is already stored. If YES, the numbers are not requested from the MS and in step 611 the LU Accept message is sent towards the MS. This is illustrated in step 504 in FIG. 2B. After the MSC/VLR has sent out the LU Accept message, it enters the "Protected Mode—Screen Calls" 660 state. If the set of number of numbers is not stored in the MSC/VLR, the flow proceeds to step 615 wherein the MSC/VLR marks that in the LU Accept message the MS will be requested to send a set of numbers to the MSC/VLR. In step 618, the MSC/VLR sends the LU Accept message towards the MS. This is illustrated in step 504 in FIG. 2B. After the MSC/VLR has sent out the LU Accept message it enters the "Wait for UPDATE ALLOWED NUMBERS message" 620 state.

Figure 2I:
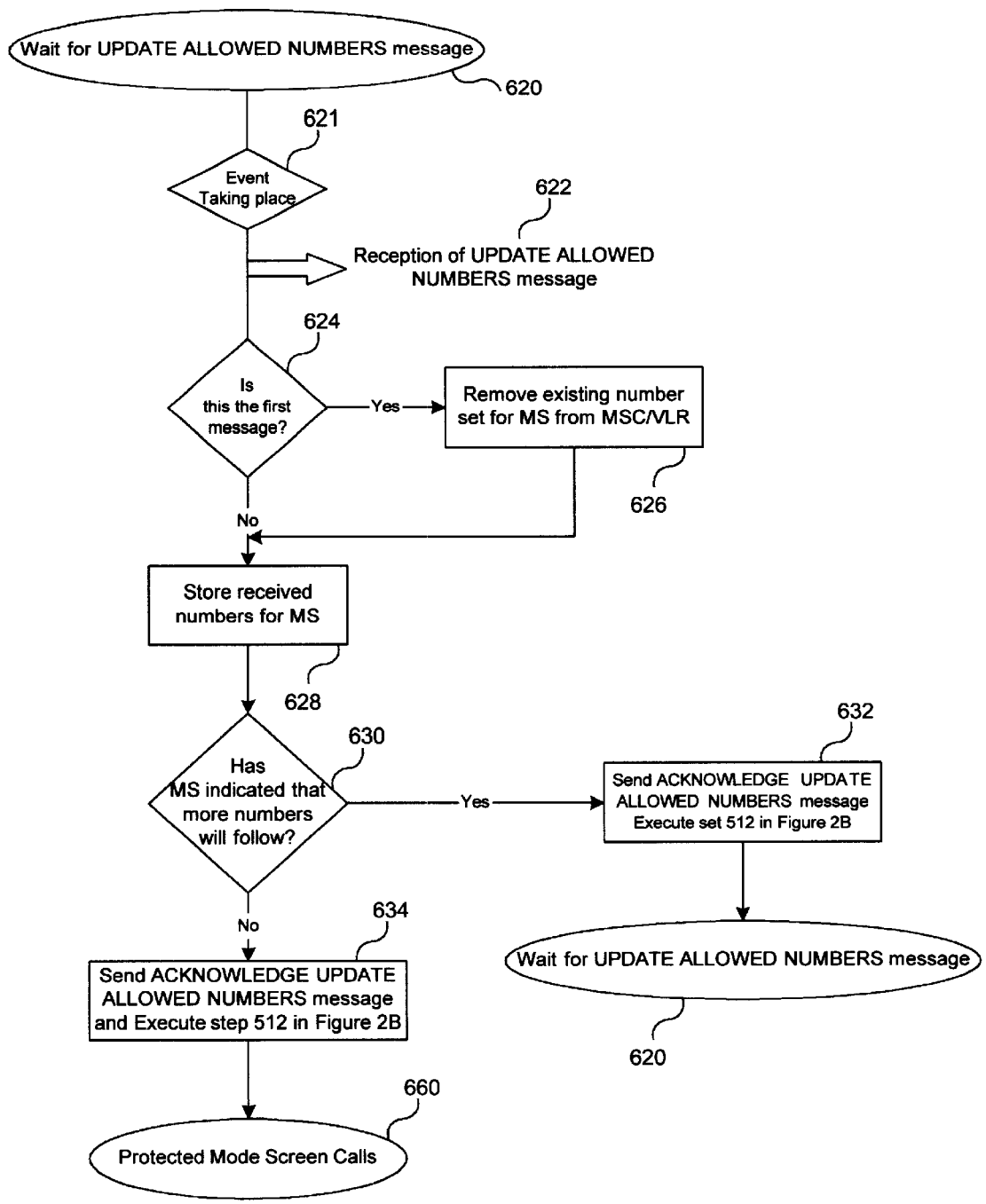

Referring now to FIG. 2I, if the MSC/VLR is in the "Wait for UPDATE ALLOWED NUMBERS message" 620 state, and it receives this expected message, event 622, the MSC/VLR checks in step 624 if this is the first time the message is received. If YES, the existing number set, if any, is removed from the MSC/VLR in step 626. In step 628, the received numbers are stored in the MSC/VLR. In step 630, it is checked if the MS has indicated that more numbers will follow. If YES, the ACKNOWLEDGE UPDATE ALLOWED NUMBERS message is sent to the MS in step 632, this is illustrated in step 512 in FIG. 2G, and the MSC/VLR remains in the "Wait for UPDATE ALLOWED NUMBERS message" 620 state. If NO, the ACKNOWLEDGE UPDATE ALLOWED NUMBERS message is sent to the MS in step 634, this is illustrated in step 512 in FIG. 2B, and the MSC/VLR enters the "Protected Mode—Screen Calls" 660 state.

Figure 2J:
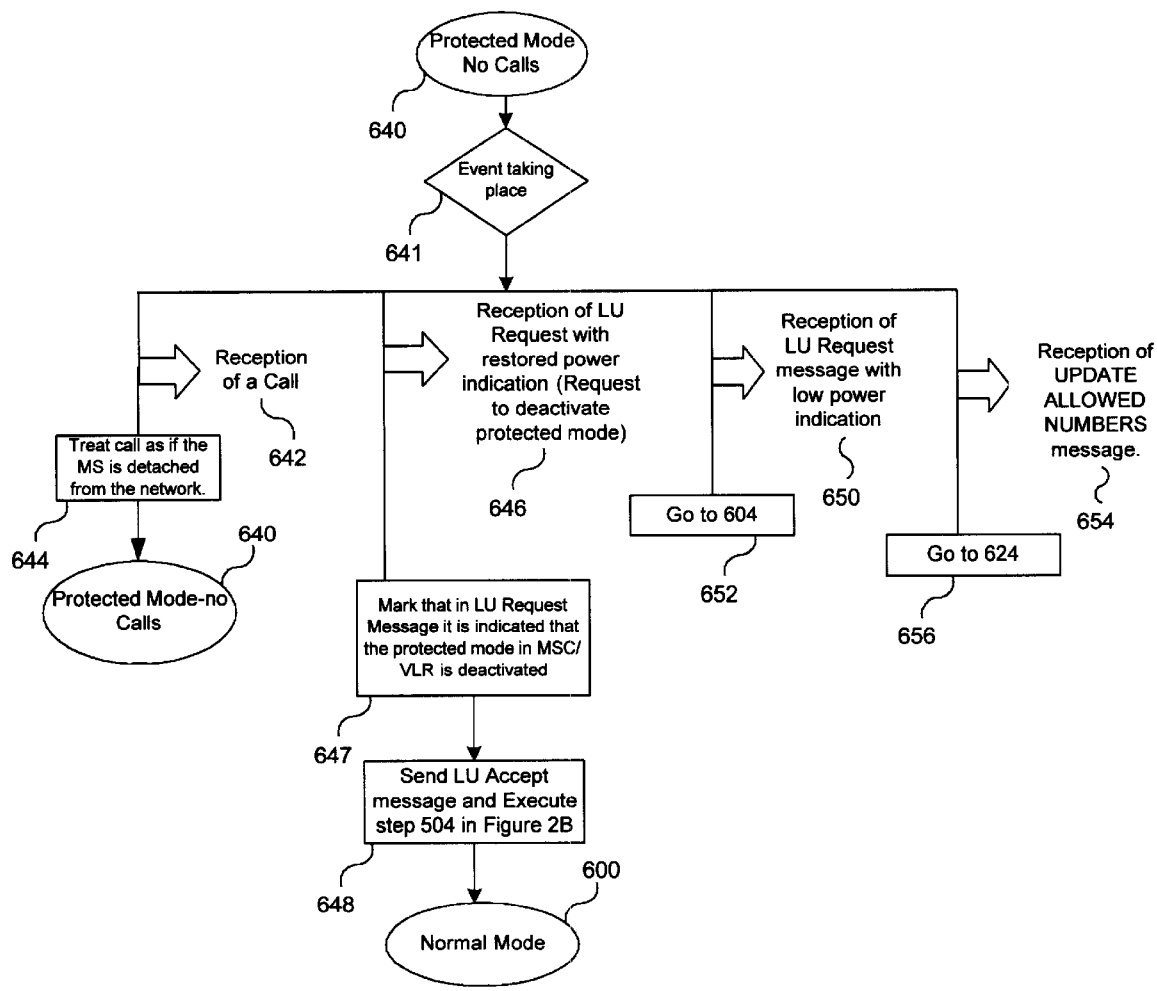

Referring now to FIG. 2J, if the MSC/VLR is in the "Protected Mode—No Calls" 640 state, and a call is received, event 642, in step 644 the call is further treated as if the MS was detached from the network, e.g. the call is forwarded. The MSC/VLR remains in the "Protected Mode—No Calls" 640 state. If the MSC/VLR is in the "Protected Mode—No Calls" 640 state, and a LU Request is received with restored power indication, event 646, in step 647 the MSC/VLR marks in the LU Accept message the protected mode in the MSC/VLR as supported and as deactivated for the MS, and in step 648 send the LU Accept message towards the MS. This is illustrated in step 504 in FIG. 2G. After the MSC/VLR has sent out the LU Accept message, it enters the "Normal Mode" 600 state. If the MSC/VLR is in the "Protected Mode—No Calls" 640 state, and a LU Request is received with low power indication, event 650, in step 652 a jump is performed in step 604. If the MSC/VLR is in the "Protected Mode—No Calls" 640 state, and a UPDATE ALLOWED NUMBERS message is received, event 654, in step 656 a jump is performed to step 624.

Figure 2K:
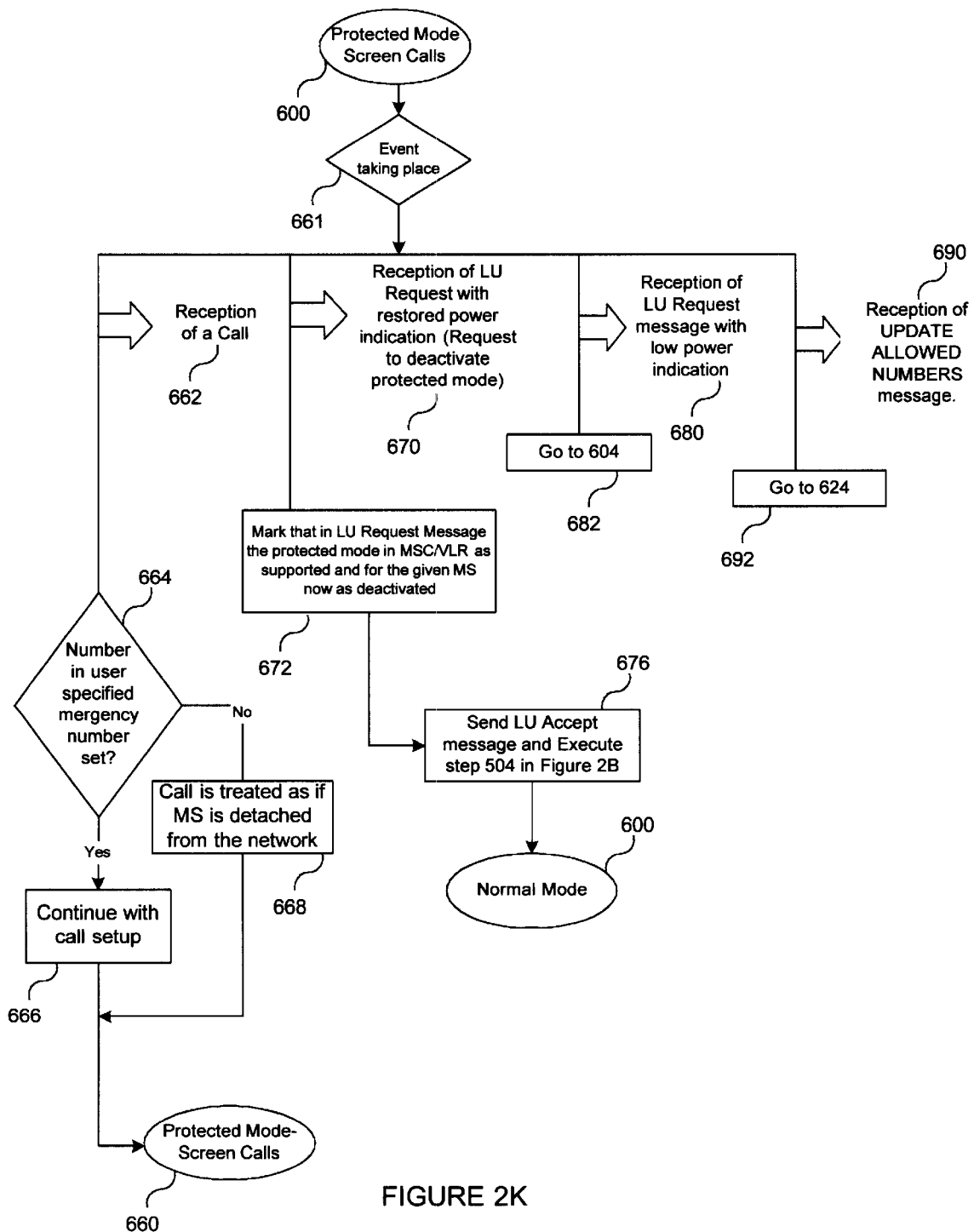

Referring now to FIG. 2K, if the MSC/VLR is in the "Protected Mode—Screen Calls" 660 state, and a call is received, event 662, in step 664 it is checked if the calling party number is in the specified emergency number set. If NO, in step 668 the call is further treated as if the MS was detached from the network, e.g. the call is forwarded; the MSC/VLR remains in the "Protected Mode—Screen Calls" 660 state. If YES, in step 666 the call set-up is continued; the MSC/VLR remains in the "Protected Mode—Screen Calls" 660 state. If the MSC/VLR is in the "Protected Mode—Screen Calls" 660 state, and a LU Request is received with restored power indication, event 670, in step 672 the MSC/VLR marks in the LU Accept message the protected mode in the MSC/VLR as supported and as deactivated for the MS, in step 674 the stored set of numbers is removed from the MSC/VLR, and in step 676 send the LU Accept message towards the MS. This is illustrated in step 504 in FIG. 2G. After the MSC/VLR has sent out the LU Accept message it enters the state Normal Mode 600. If the MSC/VLR is in the "Protected Mode—Screen Calls" 660 state, and a LU Request is received with low power indication, event 680, in step 682 a jump is performed to step 604. If the MSC/VLR is in the "Protected Mode—Screen Calls" 660 state, and a UPDATE ALLOWED NUMBERS message is received, event 690, in step 692 a jump is performed in step 624.

Figure 3:
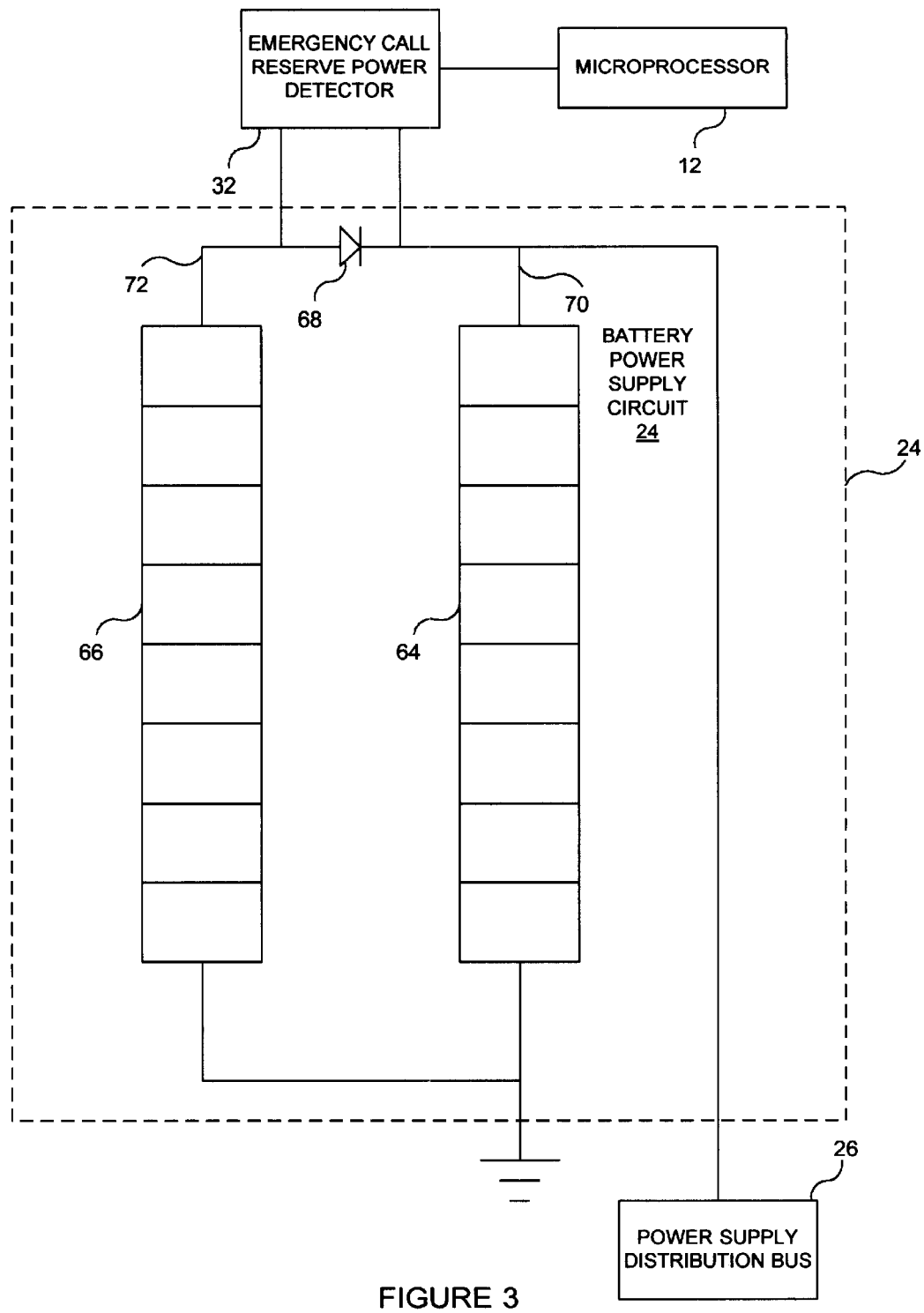
FIG. 3 is a functional block diagram of the preferred embodiment of battery power supply circuit and the emergency call reserve power detector of FIG. 1B, in which the battery power supply circuit includes one main battery and one back-up battery, and detection of decrease beneath the emergency call reserve level is indicated when the reserve power is switched into circuit by means of a steering diode.

Referring to FIG. 3, one embodiment of the battery power supply circuit 24 and the emergency call reserve power detector 32 is shown in which the power supply has a primary, or main, battery 64 and a reserve, or back-up battery 66 interconnected in parallel circuit through a diode 68. The emergency call reserve power detector monitors the voltage across the diode 68 to determine when the main battery 64 has been depleted and power is being drawn from the back-up battery 66. Before depletion of the main battery 64, the voltage at a positive terminal 70 connected to the anode of the diode 68 is not less than the voltage produced at a positive terminal 72 of the back-up battery 66 attached to the cathode of the diode 68. Consequently, the diode 68 is not forward biased and no current flows through the diode. Hence, there is no voltage drop across the diode 68 to be detected by the emergency call reserve power detector 32. However, when the main battery 64 becomes depleted, there is a decrease in the voltage across the main battery 64, and the diode 68 becomes forward biased to enable the passage of current through the diode 68, and power begins to be drawn from the back-up battery. This creates a distinctive voltage drop across the forward biased diode 68 that is detected by the emergency call reserve power detector 32 to indicate that the power level is beneath the reserve level.

In accordance with the method of the invention, the steering diode 68 functions as a sensor circuit within the power supply circuit 24 for determining when the main battery 64 has been depleted for purpose of switching the power-using circuits to the back-up battery 66. The emergency call reserve power detector provides a suitable interface circuit between the steering diode 68 and the microprocessor 12A to provide the reserve power output signal in an appropriate form compatible with the microprocessor 12A. As explained above, the microprocessor 12A, in accordance with the emergency call capability protector program of FIG. 2A, responds to the emergency reserve power output signal from the interface circuit provided by the emergency call reserve power detector 32 to selectively initiate the non-emergency inhibit mode once the main battery has been depleted.

Referring to FIG. 4, another battery power supply circuit 26 is shown for use in lieu of the two battery embodiment of FIG. 3 in which there are a plurality of main batteries 64 respectively labeled MB1 through MBN, where "N" is a natural number greater than two. Except for the first main battery MB1 that is connected directly to the power supply distribution bus 26, the main batteries are connected in parallel cascade through a series of respectively associated transistor switches 73 labeled TS2 through TSN that are controlled by a respectively associated plurality of substantially identical current sensing resistors 74. When a battery, connected in series with one of the current sensing resistors 74 becomes depleted, the voltage across the associated current sensing resistor drops beneath a pre-selected level. This voltage decrease causes the associated transistor switch to which it is connected to switch to a conductive state to connect the next successive battery to the power supply distribution bus 26. At least one back-up battery 66 and preferably a plurality of back-up batteries are connected in a parallel cascade substantially similar cascade except for the last back-up battery 66. The last back-up battery, labeled BBM, has no associated current sensing resistor and no transistor switch controlled by a current sensing switch for switching in the next successive backup battery because there is not another back-up battery in the series. The last back-up battery 66 is connected in cascade through the transistor switch 73 controlled by the voltage developed across the current sensing resistor of the previous back-up battery in the cascade of back-up batteries, if there are a plurality of back-up batteries. If there is only one back-up battery 66, then it is connected through a transistor switch TSN controlled by the current through the current sensing resistor of the last main battery of the main battery cascade, main battery MBN as shown. Only the last back-up battery 66 in the series is shown for purposes of simplicity.

The voltage that is developed across the current sensing resistor that is used to control one of the transistor switches 73 that switches into the circuit a selected one of the plurality of back-up batteries is also applied to the inputs of the emergency call reserve power detector 32. When the voltage developed across the current sensing resister 74 decreases to a level to turn on the associated transistor switch 73, the use of reserve power is sensed by the emergency call reserve power detector 32. While the emergency call reserve power detector 32 is shown connected to the last back-up battery 66, alternatively the emergency call reserve power detector 32 can be connected to an intermediate back-up battery 66.

Preferably, the plurality of main batteries 64 are substantially the same and the additional back-up and the other back-up batteries are substantially the same in terms of maximum power storage, although not necessarily the same as the main back-up batteries 66. Depending on the number of batteries provided the user can select what percent the emergency limit should be. For example, if the power supply contains five batteries, the user could select 20%, 40%, 60% or 80%. In this way, the more batteries that are provided, the more exact determination of power level can be determined.

Figure 5A:
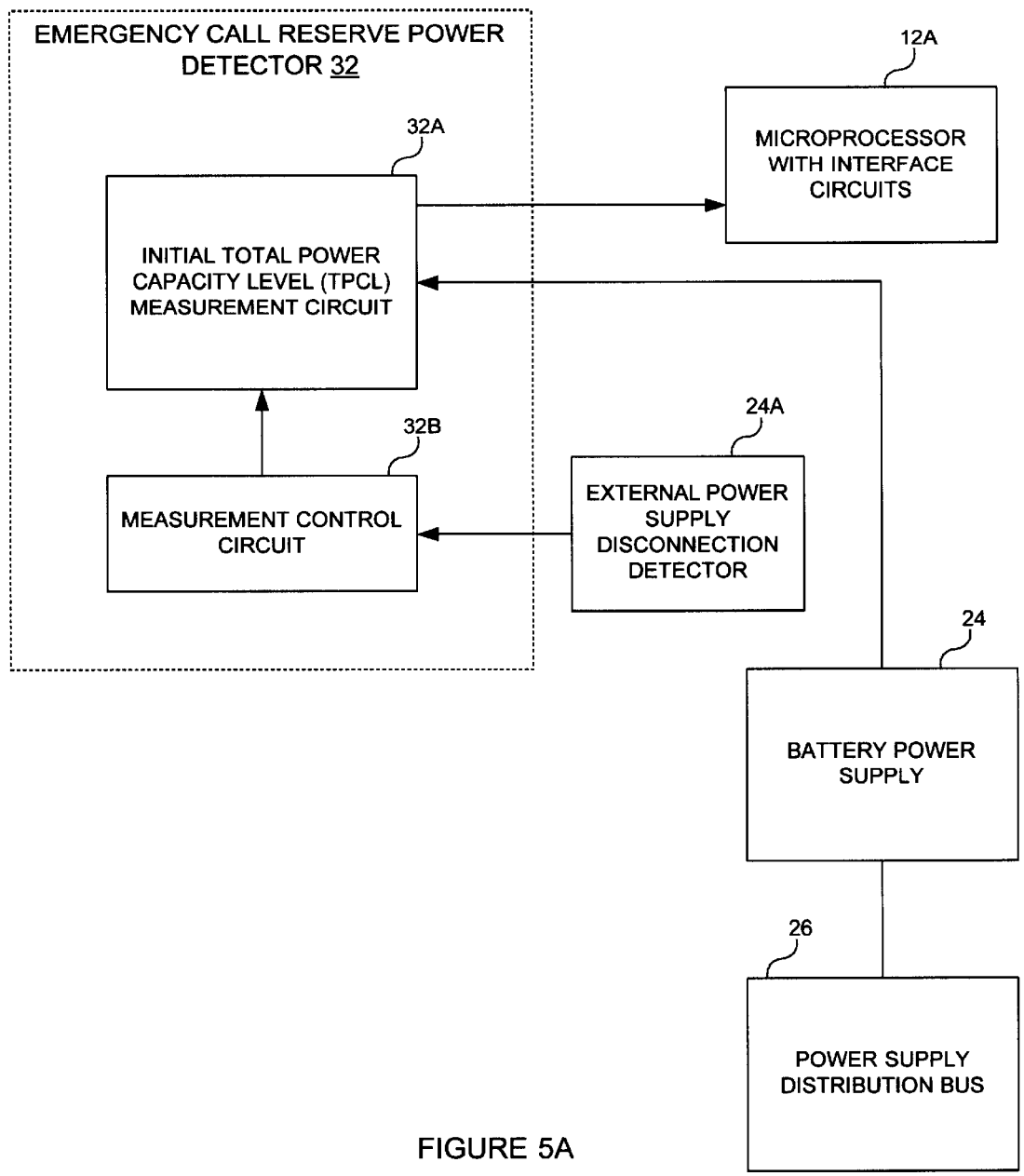
FIG. 5A is a functional block diagram of another form of the emergency call reserve power detector.

Referring now to FIG. 5A, in accordance with another aspect of the invention, the emergency call reserve power detector 32 includes only a power capacity signal generator that provides a signal representative of the fully charged total power capacity level, or the TPCL, of the battery power supply 24 to the microprocessor 12A. The microprocessor 12A in accordance with the subprogram of FIGS. 5B and 5C, automatically calculates the total consumption of power from the battery power supply circuit from the time the battery power supply circuit 24 is first releasably connected to the remainder of the mobile telephone 10, based on the known power consumption of the phone for the different activities. The microprocessor 12A subtracts the total power consumption from the total power capacity level with which it is initially provided by the reserve power detector. Alternatively, the emergency call reserve power detector of FIG. 5A is eliminated, and the total power capacity of the battery power supply circuit 24 is assumed upon disconnection of an external power supply provided to the microprocessor 12A through keystroke entries during initial setup of the emergency call capability protector.

The battery power supply circuit 24 provides DC power to the power supply distribution bus 26 and also provides an input to an initial total power capacity level, or TPCL, measurement circuit 32A of the emergency call reserve power detector 32. The TPCL measurement circuit 32A makes a measurement of the total power capacity level of the battery power supply 24 upon receipt of a measurement control signal from a measurement control circuit 32B. Also connected to the measurement control circuit 32B is an external power supply disconnection detector 24A for providing information on whether an external power supply has been removed from the system. A control signal causing the taking of a power capacity measurement is generated in response to detection of an external power supply being connected or disconnected. After this initial measurement is taken, the TPCL is provided to an input of the microprocessor 12A.

Figure 5B:
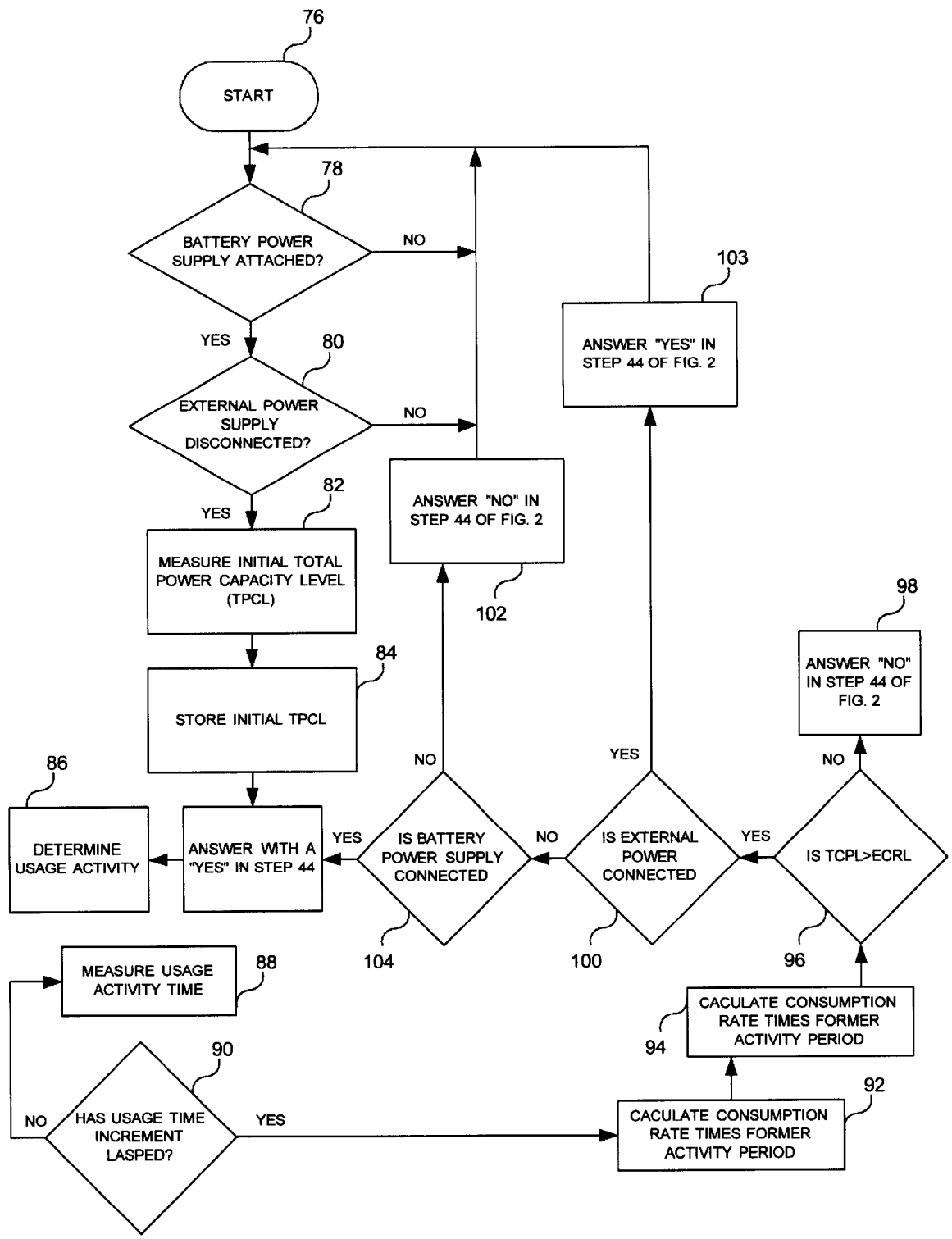
FIG. 5B is a logic flow chart of the measurement control circuit which determines when to measure the remaining power of the power supply.

FIG. 5B illustrates what the measurement control circuit 32B accomplishes. The measurement control circuit 32B determines, based on the input from the external power supply disconnection detector 24A, when to order the measurement circuit 32A to perform a measurement of the power supply.

After the start 76 of the method for computing the power used in association with the battery power supply circuit 24 and the emergency call reserve power detector 32 of FIG. 5A, in step 78 a determination is made as to whether an external power supply is disconnected. If "NO", then in step 80 an order is made to the measurement circuit 32A to take a measurement of external power supply power level. In step 84 a continuous check is made to determine if external power supply is disconnected. If "YES", in step 78 then an order is made in step 82 to measurement circuit 32A to take a measurement of battery power level. This step is also accomplished if during the check in step 84 it is determined that the external power supply has been disconnected. After step 82, a continuous check is made in step 86 to determine if the external power supply becomes reconnected. If the external power supply is reconnected than a return is made to step 80 wherein an order is made to measurement circuit 32A to take a measurement of external power supply level. If "NO" in step 86, then the query is continued.

Figure 5C:
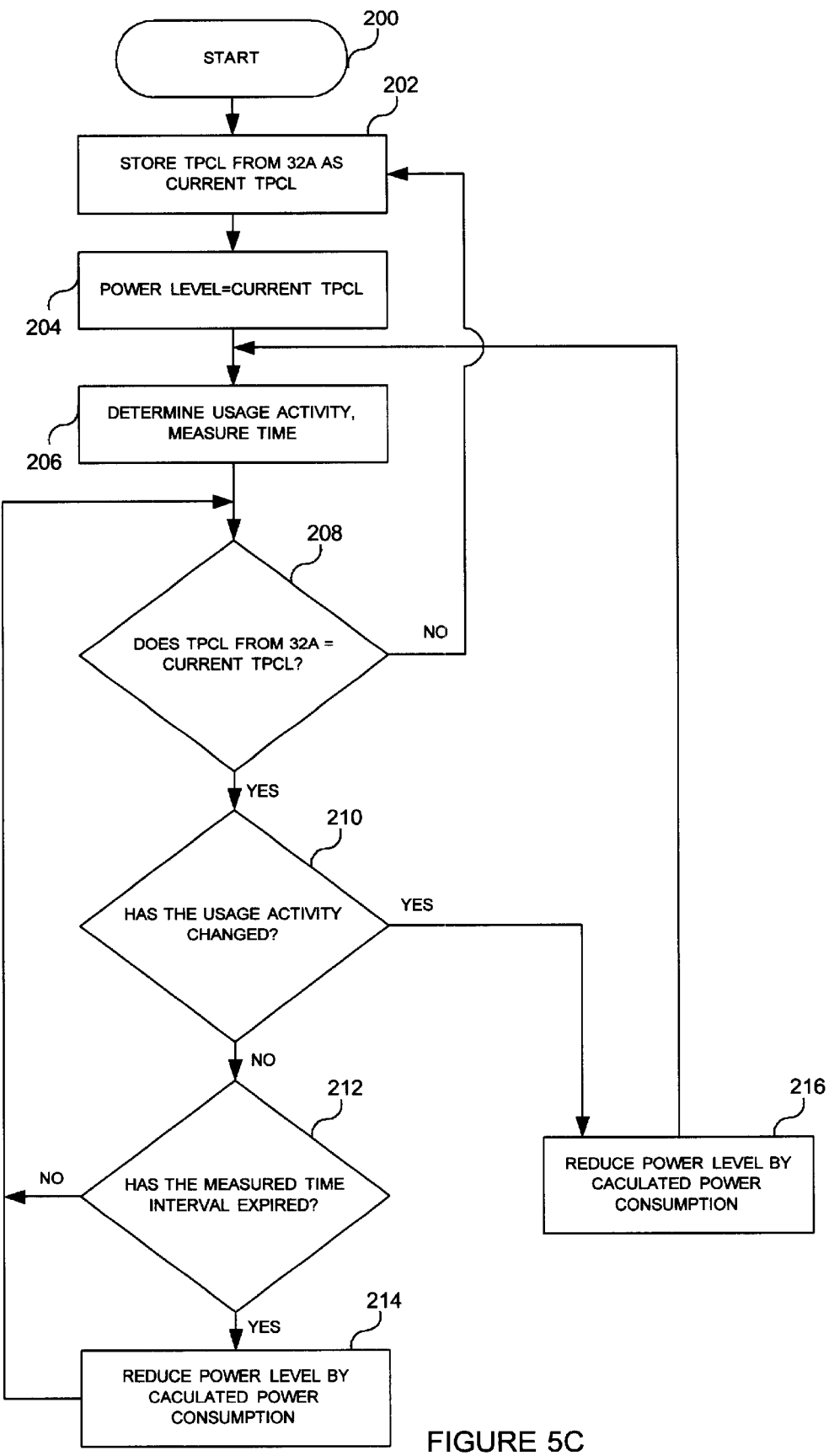
FIG. 5C is a logic flow chart of a subprogram employed by the microcomputer block of FIG. 1B which calculates the amount of remaining power.

FIG. 5C describes the way in which the microprocessor determines and maintains the current power level. After starting in 200, the TPCL from 32A is stored as the current TPCL. The power level is then set to be the current TPCL. In step 206 the usage activity and the time of said activity is measured and in step 208 a determination is made if the TPCL from 32A equals the current TPCL. If no (e.g., the external power supply was disconnected), then return to step 202 and store TPCL as current TPCL. If yes, in step 208 and hence the TPCL from 32A does equal current TPCL then a determination is made in step 210 if the usage activity has changed. If yes, then in step 216 the program reduces the power level by the calculated power consumption and a return to step 206 is accomplished. If no in step 210 then in step 212 a determination is made if the measured time interval has expired. If no in step 212 then a return to step 208 is made. If yes in step 212 then program reduces the power level by calculated power consumption in step 214 and a return to step 208 is made.

Although a preferred embodiment of the method and apparatus of the present invention has been illustrated in the accompanying drawings and described in the foregoing detailed description, it will be understood that the invention is not limited to the embodiment disclosed, but is capable of numerous rearrangements, modifications and substitutions without departing from the spirit of the invention as set forth and defined by the following claims.

What is claimed is:

1. A mobile terminal reserve power system associated with a mobile terminal, comprising:

means for detecting when the power level of said mobile terminal decreases beneath a predetermined reserve power level that is greater than an absolute minimum limit power level for operation; and means responsive to said detecting means for selectively preventing the reception of non-emergency transmissions when the power level decreases beneath said predetermined reserve power level.

2. The mobile terminal reserve power system of claim 1, wherein said means for preventing the reception of non-emergency transmissions comprises:

means for receiving identification information for a particular incoming call connection from a network serving said mobile terminal and determining within said mobile terminal if said incoming call connection is an emergency call.

3. The mobile terminal reserve power system of claim 2 further comprising:

means for storing at least one emergency number within said mobile station;

means for comparing said received identification information received for said particular incoming call connection with said stored emergency number; and means for accepting said particular incoming call connection if there is a match.

4. The mobile terminal reserve power system of claim 1, wherein said means for preventing the reception of non-emergency transmissions further comprises means for communicating with a network serving said mobile terminal data indicative of the current power state of said mobile terminal.

5. The mobile terminal reserve power system of claim 4, wherein said transmission prevention means further comprises:

means for storing at least one emergency number at said network serving said mobile terminal; means for comparing an incoming number associated with an incoming call connection with said stored emergency number to determine if there is a match; and means for preventing said incoming call connection towards said mobile terminal if there exists a match.

6. The mobile terminal reserve power system of claim 4 further comprising means for instructing said serving network to expect less frequent Location Update (LU) signals during a particular time period from said mobile terminal.

7. A method for preserving battery power within a mobile terminal comprising the steps of:

selecting a particular power level that is greater than an absolute minimum power level to operate said mobile terminal for establishing an emergency call connection;

detecting when the power level associated with said mobile terminal decreases below said selected power level; and selectively preventing, in response to said step of detecting, reception of non-emergency incoming transmission associated with said mobile terminal.

8. The method of claim 7 further comprising the steps of:

receiving identification information associated with a particular incoming call connection from a telecommunications network serving said mobile station;

determining whether said received identification information indicates an emergency call connection;

allowing said incoming call connection in response to said determination.

9. The method of claim 8 further comprising the steps of:

storing at least one emergency number within said mobile station;

comparing said received identification information received for said particular incoming call connection with said stored emergency number; and means for accepting said particular incoming call connection if there is a match.

10. The method of claim 7 further comprising the steps of communicating, in response to said step of detecting, data indicative of said battery level associated with said mobile station to a telecommunications network serving said mobile station.

11. The method of claim 10 further comprising the steps of:

storing a particular emergency number within said telecommunications network serving said mobile station;

receiving a request to establish an incoming call connection toward said mobile station;

comparing incoming identification number associated with said incoming call connection with said stored emergency number; and rejecting said request to establish said incoming call connection if there is no match.

12. The method of claim 10 further comprising the steps of requesting said serving network to expect a less frequent Location Update (LU) signal from said mobile station.

13. A mobile terminal reserve power system communicating with a telecommunications network serving a battery powered mobile terminal, comprising:

a battery;

a register for storing a certain value indicative of the absolute minimum power level associated with said battery for operation;

a detector for detecting when the power level of said battery decreases beneath said certain value stored within said register;

a processor for preventing the reception of non-emergency incoming transmission when said detector has made said detection.

14. The mobile terminal reserve power system of claim 13 further comprising:

a receiver for receiving identification information for a particular incoming call connection from said telecommunications network; and said processor determining whether said identification information represents an emergency call connection.

15. The mobile terminal reserve power system of claim 14 further comprising:

a register for storing at least one emergency number; and said processor comparing said received identification number with said stored emergency number and preventing said incoming call connection if there is no match.

16. The mobile terminal reserve power system of claim 13 further comprising a transmitter for communicating data indicative of the current power level of said mobile terminal to said telecommunications network.

17. The mobile terminal reserve power system of claim 16 further comprising:

a register within said telecommunications network for storing at least one emergency number;

a comparator for comparing an incoming number associated with an incoming call connection with said stored emergency number; and a processor for preventing said incoming call connection towards said mobile terminal if there is no match.

18. The mobile terminal reserve power system of claim 16 wherein said transmitter further transmits data instructing said telecommunications network to expect less frequent Location Update (LU) signals during a particular time period from said mobile terminal.

* * * * *